United States Patent
Landman

(10) Patent No.: US 11,860,680 B2
(45) Date of Patent: Jan. 2, 2024

(54) SOFTWARE PIPELINE AND RELEASE VALIDATION

(71) Applicant: JFrog Ltd., Netanya (IL)

(72) Inventor: Yoav Landman, Netanya (IL)

(73) Assignee: JFrog Ltd., Netanya (IL)

( * ) Notice: Subject to any disclaimer, the term of this patent is extended or adjusted under 35 U.S.C. 154(b) by 52 days.

(21) Appl. No.: 17/221,027

(22) Filed: Apr. 2, 2021

(65) Prior Publication Data

US 2022/0164452 A1    May 26, 2022

Related U.S. Application Data

(60) Provisional application No. 63/117,723, filed on Nov. 24, 2020.

(51) Int. Cl.
  *G06F 21/60* (2013.01)
  *G06F 8/71* (2018.01)
  (Continued)

(52) U.S. Cl.
  CPC .............. *G06F 21/602* (2013.01); *G06F 8/71* (2013.01); *G06F 16/9027* (2019.01);
  (Continued)

(58) Field of Classification Search
  CPC ...... G06F 21/602; G06F 8/71; G06F 16/9027; H04L 9/0618; H04L 9/0643; H04L 9/3247; H04L 9/50
  See application file for complete search history.

(56) References Cited

U.S. PATENT DOCUMENTS 5,671,282 A    9/1997 Wolff et al.
5,915,238 A    6/1999 Tjaden
(Continued)

FOREIGN PATENT DOCUMENTS

WO    WO-2012153173 A2    11/2012

OTHER PUBLICATIONS

Patent Cooperation Treaty, International Search Report and Written Opinion issued for PCT Application No. PCT/IB2020/056777, dated Oct. 19, 2020, 15 pages.
(Continued)

*Primary Examiner* — Jeffrey C Pwu
*Assistant Examiner* — Mayasa A. Shaawat
(74) *Attorney, Agent, or Firm* — Norton Rose Fulbright US LLP

(57) ABSTRACT

The present disclosure provides systems, methods, and computer readable storage devices for validating that a software release has successfully completed multiple development stages of a development process without alteration. To illustrate, as software (e.g., one or more files or artifacts) completes at least a portion of a development process including the development stages, data components are generated. Digital signatures are generated based on the data components and a private key, and the digital signatures are stored in a secure data structure, such as a blockchain or a tree structure. Upon receipt of the data components (e.g., as validation data of a software release) by a node device, the node device generates validation signatures based on the data components and a public key and compares the validation signatures to the digital signatures stored in the secure data structure to validate the software before processing the software.

23 Claims, 9 Drawing Sheets

(51) Int. Cl.
*G06F 16/901* (2019.01)
*H04L 9/06* (2006.01)
*H04L 9/32* (2006.01)
*H04L 9/00* (2022.01)

(52) U.S. Cl.
CPC .......... *H04L 9/0618* (2013.01); *H04L 9/0643* (2013.01); *H04L 9/3247* (2013.01); *H04L 9/50* (2022.05)

(56) References Cited

U.S. PATENT DOCUMENTS

| | | |
|---|---|---|
| 5,931,946 A | 8/1999 | Terada et al. |
| 6,604,236 B1 | 8/2003 | Draper et al. |
| 7,007,042 B2 | 2/2006 | Lubbers et al. |
| 7,403,901 B1 | 7/2008 | Carley et al. |
| 7,464,158 B2 | 12/2008 | Albornoz |
| 7,814,146 B2 | 10/2010 | Chavez et al. |
| 7,987,368 B2 | 7/2011 | Zhu et al. |
| 8,036,140 B2 | 10/2011 | Rao et al. |
| 8,196,186 B2 | 6/2012 | Mityagin et al. |
| 8,239,446 B2 | 8/2012 | Navar et al. |
| 8,364,758 B2 | 1/2013 | Hydrie et al. |
| 8,413,198 B2 | 4/2013 | Connor et al. |
| 8,510,571 B1 | 8/2013 | Chang et al. |
| 8,788,830 B2 * | 7/2014 | Piersol .................. H04L 9/3236 713/157 |
| 9,009,820 B1 | 4/2015 | McDougal et al. |
| 9,053,124 B1 | 6/2015 | Dornquast et al. |
| 9,280,339 B1 | 3/2016 | Prunicki et al. |
| 9,635,107 B2 | 4/2017 | Souza et al. |
| 9,659,155 B2 | 5/2017 | Kosovan |
| 9,819,665 B1 | 11/2017 | Machani |
| 9,842,062 B2 | 12/2017 | Ford et al. |
| 9,946,531 B1 | 4/2018 | Fields et al. |
| 9,971,594 B2 | 5/2018 | Fox et al. |
| 10,043,026 B1 | 8/2018 | Salour et al. |
| 10,091,215 B1 | 10/2018 | Word |
| 10,339,299 B1 | 7/2019 | Magnuson et al. |
| 10,387,570 B2 | 8/2019 | VanBlon et al. |
| 10,409,838 B1 | 9/2019 | George et al. |
| 10,701,143 B1 | 6/2020 | Jha et al. |
| 10,719,369 B1 | 7/2020 | Aithal et al. |
| 10,754,952 B2 | 8/2020 | Muller et al. |
| 10,785,334 B2 | 9/2020 | Kristiansson et al. |
| 10,812,975 B1 | 10/2020 | Easwar Prasad et al. |
| 10,880,407 B2 | 12/2020 | Reynolds et al. |
| 10,911,337 B1 | 2/2021 | De Kosnik et al. |
| 10,986,387 B1 | 4/2021 | Parulkar et al. |
| 11,048,590 B1 | 6/2021 | Sapuntzakis et al. |
| 11,064,323 B2 | 7/2021 | Esselink et al. |
| 11,249,739 B2 * | 2/2022 | Atkinson .................. G06F 8/60 |
| 11,284,258 B1 | 3/2022 | Wei et al. |
| 2002/0062439 A1 | 5/2002 | Cotugno et al. |
| 2002/0156893 A1 | 10/2002 | Pouyoul et al. |
| 2003/0220880 A1 | 11/2003 | Lao et al. |
| 2004/0064722 A1 | 4/2004 | Neelay et al. |
| 2004/0181561 A1 | 9/2004 | Knox et al. |
| 2004/0250115 A1 | 12/2004 | Gemmel et al. |
| 2005/0132348 A1 | 6/2005 | Meulemans et al. |
| 2006/0107286 A1 | 5/2006 | Connor et al. |
| 2006/0136547 A1 | 6/2006 | Neuhaus et al. |
| 2006/0195816 A1 | 8/2006 | Grandcolas et al. |
| 2006/0236392 A1 | 10/2006 | Thomas et al. |
| 2006/0259967 A1 | 11/2006 | Thomas et al. |
| 2007/0169199 A1 | 7/2007 | Quinnell et al. |
| 2007/0220575 A1 * | 9/2007 | Cooper ............ H04N 21/41415 348/E7.071 |
| 2007/0294686 A1 | 12/2007 | Oh |
| 2008/0005113 A1 | 1/2008 | Li |
| 2008/0005120 A1 | 1/2008 | Li |
| 2008/0082648 A1 | 4/2008 | Ahmed et al. |
| 2008/0163374 A1 | 7/2008 | Rogers et al. |
| 2008/0178287 A1 | 7/2008 | Akulavenkatavara et al. |
| 2008/0294860 A1 | 11/2008 | Stakutis et al. |
| 2009/0013317 A1 | 1/2009 | Abfalter et al. |
| 2009/0083812 A1 | 3/2009 | Tang |
| 2009/0119655 A1 | 5/2009 | Quilty |
| 2009/0144340 A1 | 6/2009 | Ferguson et al. |
| 2009/0210697 A1 | 8/2009 | Chen et al. |
| 2009/0290715 A1 | 11/2009 | Mityagin et al. |
| 2009/0313353 A1 | 12/2009 | Lou |
| 2010/0217694 A1 | 8/2010 | Knighton |
| 2010/0223472 A1 | 9/2010 | Alvarsson |
| 2010/0287363 A1 | 11/2010 | Thorsen |
| 2011/0010258 A1 | 1/2011 | Chavez et al. |
| 2011/0010421 A1 | 1/2011 | Chavez et al. |
| 2011/0071841 A1 | 3/2011 | Fomenko et al. |
| 2011/0072075 A1 | 3/2011 | Gautier |
| 2011/0093701 A1 * | 4/2011 | Etchegoyen .......... G06F 21/121 713/176 |
| 2011/0107419 A1 | 5/2011 | Vidal et al. |
| 2011/0113012 A1 | 5/2011 | Gruhl et al. |
| 2011/0225311 A1 | 9/2011 | Liu et al. |
| 2011/0307564 A1 | 12/2011 | Luo et al. |
| 2012/0090025 A1 | 4/2012 | Milner et al. |
| 2012/0131566 A1 | 5/2012 | Morgan et al. |
| 2012/0151051 A1 | 6/2012 | Zhang et al. |
| 2012/0151245 A1 | 6/2012 | Chang et al. |
| 2012/0159469 A1 | 6/2012 | Laor |
| 2012/0222112 A1 | 8/2012 | DiFalco et al. |
| 2012/0233134 A1 | 9/2012 | Barton et al. |
| 2012/0240096 A1 | 9/2012 | Sass |
| 2012/0240236 A1 | 9/2012 | Wyatt et al. |
| 2012/0259920 A1 | 10/2012 | Mathieu et al. |
| 2012/0297405 A1 | 11/2012 | Zhang et al. |
| 2013/0073727 A1 | 3/2013 | Souza et al. |
| 2013/0081100 A1 | 3/2013 | Sreehari et al. |
| 2013/0124807 A1 | 5/2013 | Nielsen et al. |
| 2013/0132946 A1 | 5/2013 | Ma |
| 2013/0268927 A1 | 10/2013 | Cochran |
| 2013/0326481 A1 | 12/2013 | Kannan |
| 2014/0172972 A1 | 6/2014 | Burba et al. |
| 2014/0173024 A1 | 6/2014 | Burba et al. |
| 2014/0245376 A1 | 8/2014 | Hibbert et al. |
| 2014/0373160 A1 | 12/2014 | Shigemoto et al. |
| 2015/0003296 A1 | 1/2015 | Fan et al. |
| 2015/0088992 A1 | 3/2015 | Ioannidis et al. |
| 2015/0099510 A1 | 4/2015 | Shah et al. |
| 2015/0172352 A1 | 6/2015 | Gopalakrishnan et al. |
| 2015/0180893 A1 | 6/2015 | Im et al. |
| 2015/0268881 A1 | 9/2015 | Nielsen et al. |
| 2015/0301823 A1 | 10/2015 | Hatakeyama |
| 2015/0302037 A1 | 10/2015 | Jackson et al. |
| 2015/0312243 A1 | 10/2015 | Ponsford et al. |
| 2015/0317145 A1 | 11/2015 | Katariya et al. |
| 2015/0341178 A1 | 11/2015 | Tanaka et al. |
| 2015/0341325 A1 | 11/2015 | Al Jabri |
| 2015/0350186 A1 | 12/2015 | Chan et al. |
| 2016/0006837 A1 | 1/2016 | Reynolds et al. |
| 2016/0117235 A1 | 4/2016 | Mishra et al. |
| 2016/0124665 A1 | 5/2016 | Jain et al. |
| 2016/0164900 A1 | 6/2016 | Pericin |
| 2016/0179867 A1 | 6/2016 | Li et al. |
| 2016/0182494 A1 | 6/2016 | Lissounov et al. |
| 2016/0182556 A1 | 6/2016 | Tatourian et al. |
| 2016/0234237 A1 | 8/2016 | Thakar et al. |
| 2016/0266890 A1 | 9/2016 | Aleksandrov et al. |
| 2016/0267101 A1 | 9/2016 | Clissold et al. |
| 2016/0344834 A1 | 11/2016 | Das |
| 2016/0373440 A1 | 12/2016 | Mather et al. |
| 2017/0003951 A1 | 1/2017 | Newell et al. |
| 2017/0034023 A1 | 2/2017 | Nickolov et al. |
| 2017/0060546 A1 | 3/2017 | Prasad et al. |
| 2017/0147338 A1 | 5/2017 | Jackson et al. |
| 2017/0262657 A1 | 9/2017 | Salmon-Legagneur et al. |
| 2017/0264588 A1 | 9/2017 | Hunt et al. |
| 2017/0300309 A1 | 10/2017 | Berger et al. |
| 2017/0357807 A1 | 12/2017 | Harms et al. |
| 2017/0371499 A1 | 12/2017 | Checkley et al. |
| 2018/0095993 A1 | 4/2018 | Clark |
| 2018/0136923 A1 | 5/2018 | Xiao |
| 2018/0189043 A1 | 7/2018 | Habayeb |
| 2018/0240546 A1 | 8/2018 | Pfeiffer |

(56) References Cited

U.S. PATENT DOCUMENTS

| | | | |
|---|---|---|---|
| 2018/0260212 A1* | 9/2018 | Wisnovsky | G06F 16/113 |
| 2018/0373517 A1 | 12/2018 | Hu | |
| 2019/0014161 A1 | 1/2019 | Doar et al. | |
| 2019/0050576 A1 | 2/2019 | Boulton | |
| 2019/0080080 A1 | 3/2019 | Ogura et al. | |
| 2019/0130114 A1 | 5/2019 | Smith et al. | |
| 2019/0138287 A1* | 5/2019 | De Capoa | G06F 9/44505 |
| 2019/0155598 A1 | 5/2019 | Bainville et al. | |
| 2019/0205121 A1 | 7/2019 | Ericson | |
| 2019/0303623 A1* | 10/2019 | Reddy | G06F 8/71 |
| 2019/0305957 A1 | 10/2019 | Reddy et al. | |
| 2019/0306173 A1 | 10/2019 | Reddy et al. | |
| 2019/0332367 A1 | 10/2019 | Navarrete Michelini et al. | |
| 2019/0379723 A1 | 12/2019 | Demasi et al. | |
| 2020/0012441 A1 | 1/2020 | Chheda et al. | |
| 2020/0026857 A1 | 1/2020 | Muller et al. | |
| 2020/0076618 A1 | 3/2020 | Driever et al. | |
| 2020/0076807 A1 | 3/2020 | Driever et al. | |
| 2020/0084202 A1 | 3/2020 | Smith et al. | |
| 2020/0162543 A1 | 5/2020 | Mosko et al. | |
| 2020/0177397 A1* | 6/2020 | Harrington | H04L 9/3297 |
| 2020/0186505 A1 | 6/2020 | Amar et al. | |
| 2020/0351089 A1 | 11/2020 | Wentz | |
| 2020/0372183 A1 | 11/2020 | Rangaiah et al. | |
| 2020/0409986 A1 | 12/2020 | Soroushian et al. | |
| 2020/0412691 A1 | 12/2020 | Shribman et al. | |
| 2021/0021428 A1* | 1/2021 | Landman | G06F 8/60 |
| 2021/0111875 A1* | 4/2021 | Le | H04L 9/0861 |
| 2021/0218800 A1 | 7/2021 | Landman | |
| 2022/0150073 A1* | 5/2022 | Androulaki | G06K 7/10722 |

OTHER PUBLICATIONS

Li et al. "A Quantitative and Comparative Study of Network-Level Efficiency for Cloud Storage Services," ACM Trans. Model. Perform. Eval. Comput. Syst., vol. 4, No. 1, Article 3, 2019, 32 pages.
Jana et al. "Management of Security and Privacy Issues of Application Development in Mobile Cloud Environment: A Survey," IEEE International Conference on Recent Advances and Innovations in Engineering, May 2014, 6 pages.
Patent Cooperation Treaty, International Search Report and Written Opinion issued for PCT Application No. PCT/IB2020/056776, dated Feb. 22, 2021, 10 pages.
Post, H. et al., "Linking Functional Requirements and Software Verification," 2009 17th IEEE International Requirements Engineering Conference, 2009, 8 pages.
Patent Cooperation Treaty, International Search Report and Written Opinion issued for PCT Application No. PCT/IB2021/050134, dated Mar. 4, 2021, 14 pages.
JFrog; "Access Tokens," https://www.jfrog.com/confluence/display/JCR6X/Access+Tokens, Jan. 29, 2020 (Year: 2020), 1 page.
Alibaba Cloud; "Alibaba Dragonfly DCOS Case Study: China Mobile (Zhejiang Branch)," https://alibaba-cloud.medium.com/alibaba-dragonfly-dcos-case-study-china-mobile-zhejiang-branch-a13dc751a2c, Jan. 14, 2019 (Year: 2019), 14 pages.
Eduonix.com; "Alibaba's DragonFly—A New P2P File Distribution Framework," https://blog.eduonix.com/software-development/alibabas-dragonfly-p2p-distribution/, Jul. 4, 2018 (Year: 2018), 3 pages.
Alibaba Cloud; "Behind Alibaba's Double 11 Mysterious "Dragonfly" Technology® C PB-Grade Large-File Distribution System," https://www.alibabacloud.com/blog/behind-alibabas-double-11-mysterious-dragonfly-technology-®c-pb-grade-large-file-distribution-system_594074, Oct. 15, 2018 (Year: 2018), 14 pages.
Seneviratne, A.I.D.K. "Enabling an Authentication Mechanism for Docker Remote API," Mar. 2017 (Year: 2017), 70 pages.
IEEE; "FID: A Faster Image Distribution System for Docker Platform," 2017 (Year: 2017), 8 pages.
DragonFly; "What Is DragonFly?" https://web.archive.org/web/20190501065255/https://d7y.io/enus/docs/overview/what_is_dragonfly.html, May 1, 2019 (Year: 2019), 3 pages.
Uber Engineering Blog; "Introducing Kraken, an Open Source Peer-to-Peer Docker Registry," https://eng.uber.com/introducing-kraken/, May 5, 2019 (Year: 2019), 3 pages.
JFrog; "Searching for Artifacts," https://www.jfrog.com/confluence/display/JCR6X/Searching+for+Artifacts, Jan. 29, 2020 (Year: 2020), 3 pages.
Yoshida et al. "Understanding the Origins of Weak Cryptographic Algorithms Used for Signing Android Apps," 2018 $42^{nd}$ IEEE International Conference on Computer Software and Applications; 6 pages.

\* cited by examiner

SOFTWARE PIPELINE AND RELEASE VALIDATION

CROSS-REFERENCE TO RELATED APPLICATIONS

The present application claims the benefit of U.S. Provisional Patent Application No. 63/117,723, filed Nov. 24, 2020 entitled "SOFTWARE RELEASE VALIDATION", the contents of which are incorporated by reference herein in their entirety.

TECHNICAL FIELD

The present application is generally related to the technical field of software deployment, and more particularly, but not by way of limitation, to techniques for validation of a software development process, such as a software development pipeline.

BACKGROUND

Computer systems and software have become an integral part of modern society and affect a variety of aspects of daily life. Software can be developed as a monolith, such as one piece of software, or as a service-oriented architecture where each piece of software provides a specific service and multiple pieces of software operate together. Software can be updated to add or remove functionality, to correct bugs (e.g., critical/functional issues), and/or to address security issues. To update a piece of software, a new version is developed and deployed to a device, such as a software consumable device that stores and executes the new version of the software.

As part of generating a software release, software (e.g., one or more files) may undergo one or more development stages of a development process. For example, a continuous integration/continuous delivery (CI/CD) pipeline may be configured at one or more computing devices for performing the development stages of the development process to build and deploy a software release. Some of these development stages include generating software builds and performing different types of tests on the builds. However, once the software release is finalized and deployed, there is no way to validate that the software release successfully completed each of the one or more development stages and that the software release has not been altered after completing each of the one or more development stages. For example, a malicious programmer may alter code after completion of one or more development stages or may provide additional code that has not undergone the one or more development stages. Executing software that cannot be validated as secure after the development process can lead to problems, such as vulnerabilities in a computer system that executes the software.

BRIEF SUMMARY

Aspects of the present disclosure provide systems, methods, and computer-readable storage media that provide techniques for verifying completion of one or more stages of a multi-stage development process, such as a CI/CD pipeline process, for a software release and for validating information generated by the one or more stages using validation information provided with the software release. To illustrate, a server (e.g., a deployment system/application) may obtain files generated during performance of multiple development stages of a development process for a software release. For example, the server may perform the development stages to generate the files (e.g., software) or the server may receive the files from an entity device that performs the development stages. In addition to generating the files after completion of the multiple development stages, initiating or performing some or all of the development process (e.g., a pipeline run) may generate data components (e.g., segments) of development data. For example, initiating the development process may generate head data, performance of each development stage may generates stage data (also referred to as "run data") for the development stage, and completion of the development process may generate development information (e.g., run component data). To further illustrate, the head data may include name and version information as well as a full configuration at the time the development process is initiated. The stage data may include configuration data, inputs, outputs, start times, end times, authors, pass/fail information, and/or other information associated with the respective development stage. The development information (e.g., the run component data) may include a completion time and reference to each of the other run components, such as an ordered list of hashes of the head data and the stage data of each development stage.

The server may generate a digital signature for one or more of data components (e.g., the head data, the stage data for the multiple development stages, and the development data (also referred to as "information" or "info")), or all of the components, based on initial pipeline data, the stage data associated with the one or more development stages, and information associated with completion of all of the development stages. The server may generate the digital signatures using a private key of a private/public key pair that is generated based on a master key that is accessible to the server. In some implementations, the server may "stringify" (e.g., serially aggregate and convert to a string value) or otherwise package an entirety of the stage data for a development stage (or other data component/segment) in order to generate the digital signature for the development stage (or other data component). In some other implementations, the server may generate a hash value based on the stage data (or other data component), or otherwise compress the stage data (or other data component) in a reproducible way in order, and the hash or compressed version is signed to reduce the size of the digital signature.

The server may store the generated digital signatures as entries in a secure data structure, such as a private blockchain or other data structure that is configured for serial addition of entries such that each subsequent entry is based at least in part on a previous entry. In some implementations, the digital signatures may be stored in a tree structure, such as a Merkle tree as a non-limiting example, either as a blockchain or in a database accessible to node devices. As entries are generated during the development process, the secure data structure may be considered "append only" as each entry is based at least in part on a previous entry. After completion of the development process, the private key may be discarded, such that the secure data structure becomes "read only." In some implementations, after addition of a last (e.g., final) entry into the secure data structure, the server may encrypt the secure data structure using a storage key, such as the master key or a different encryption key that is accessible to node devices. After the performance of the multiple development stages (e.g., the development process) are complete, the server may discard the private key and may provide the files and validation information to a node device (e.g., an edge device or customer device). The validation information includes the secure data structure, the data components, and the public key. To illustrate, the server may store the validation information in a database, or the server may transmit the validation information and the files to the node device.

After receipt of the files and the validation information, the node device may validate that the files have completed the development stages, and have not been subsequently altered, using the validation information. To illustrate, the node device may validate the received stage data for a particular development stage by generating a validation signature based on the stage data for the particular development stage and the public key. As another example, the node device may generate a validation signature for the head data by signing the head data (or a hash thereof) using the public key. The node device may compare the generated validation signature to the corresponding digital signature for the particular data component that is stored in the secure data structure. If the validation signature matches the corresponding digital signature, the node device validates that the files have completed the particular development stage (or an entirety of the development process) without being altered. If the validation signature fails to match the corresponding digital signature, validation fails. The node device may process the received files based on a successful validation, and the node device may perform one or more recovery options, such as discarding the files, transmitting a message to the server, and the like, based on a failed validation. Because the secure data structure (e.g., the private blockchain) is immutable and can no longer be altered after loss of the private key, a malicious actor is unable to alter the secure data structure without being detected. Thus, use of the secure data structure that stores the digital signatures enables validation, at the node device, that the received files have undergone the development stages of the development process and remain unaltered. Additionally, the node device may validate that the received stage data accurately reflects the corresponding development stage(s) of the development process. Thus, improved security of software releases may be provided through the sharing of a secured data structure that includes multiple digital signatures, which may reduce or eliminate execution of unverified software at the node device.

According to one aspect, a method for sharing validation information of a software release associated with multiple development stages is described. The method includes obtaining, by one or more processors, one or more files associated with the software release based on performance of at least a portion of a development process that includes the multiple development stages. Performance of at least a portion of the development process generates data components associated with general development parameters, one or more development stages of the multiple development stages, or a combination thereof. The method also includes generating, by the one or more processors, a private key and a public key based on a master key accessible to the one or more processors. The method includes, for each of the data components, generating, by the one or more processors, a digital signature based at least in part on the respective data component and the private key, and adding, by the one or more processors, an entry that includes the digital signature to a secure data structure accessible to one or more node devices. The entry is added based on a previous entry in the secure data structure. The method further includes initiating, by the one or more processors, transmission of the data components, the public key, and the one or more files to the one or more node devices.

According to another aspect, a system for sharing validation information of a software release associated with multiple development stages is described. The system includes at least one memory storing instructions and one or more processors coupled to the at least one memory. The one or more processors are configured to execute the instructions to cause the one or more processors to obtain one or more files associated with the software release based on performance of at least a portion of a development process that includes the multiple development stages. Performance of at least a portion of the development process generates data components associated with general development parameters, one or more development stages of the multiple development stages, or a combination thereof. The one or more processors are also configured to generate a private key and a public key based on a master key accessible to the one or more processors. The one or more processors are configured to, for each of the data components, generate a digital signature based at least in part on the respective data component and the private key and add an entry that includes the digital signature to a secure data structure accessible to the one or more node devices. The entry is added based on a previous entry in the secure data structure. The one or more processors are further configured to initiate transmission of the data components, the public key, and the one or more files to the one or more node devices.

According to another aspect, a computer program product is described that includes a computer-readable storage device, such as a non-transitory computer-readable storage medium, that includes instructions that, when executed by one or more processors, cause the one or more processors to perform operations for sharing validation information of a software release associated with multiple development stages. The operations include obtaining one or more files associated with the software release based on performance of at least a portion of a development process that includes the multiple development stages. Performance of at least the portion of the development process generates data components associated with general development parameters, one or more development stages of the multiple development stages, or a combination thereof. The operations also include generating a private key and a public key based on a master key accessible to the one or more processors. The operations include, for each of the data components, generating a digital signature based at least in part on the respective data component and the private key and adding an entry that includes the digital signature to a secure data structure accessible to one or more node devices. The entry is added based on a previous entry in the secure data structure. The operations further include initiating transmission of the data components, the public key, and the one or more files to the one or more node devices.

According to another aspect, a method for validation of a deployed software release associated with multiple development stages is described. The method includes receiving, by one or more processors, one or more files of the deployed software release and validation information including data components associated with a development process that includes the multiple development stages. The method also includes accessing, by the one or more processors, a secure data structure and a public key associated with the development process. The secure data structure includes one or more digital signatures associated with the data components. The public key is associated with a private key used to generate the one or more digital signatures. The method also includes validating the one or more digital signatures by, for each of the one or more digital signatures included in the secure data structure, generating, by the one or more processors, a validation signature based at least in part on the data component corresponding to the digital signature and the public key, and comparing, by the one or more processors, the validation signature to the digital signature in the secure data structure. The method further includes processing, by the one or more processors, the one or more files based on validation of the one or more digital signatures.

According to another aspect, a system for validation of a deployed software release associated with multiple development stages is described. The system includes at least one memory storing instructions and one or more processors coupled to the at least one memory. The one or more processors are configured to execute the instructions to cause the one or more processors to receive one or more files of the deployed software release and validation information including data components associated with a development process that include the multiple development stages. The one or more processors are also configured to access a secure data structure and a public key associated with the development process. The secure data structure includes one or more digital signatures associated with the data components. The public key is associated with a private key used to generate the one or more digital signatures. The one or more processors are also configured to, for each of the one or more digital signatures included in the secure data structure to validate the one or more digital signatures, generate a validation signature based at least in part on the data component corresponding to the digital signature and the public key, and compare the validation signature to the digital signature in the secure data structure. The one or more processors are further configured to process the one or more files based on validation of the one or more digital signatures.

According to another aspect, a computer program product is described that includes a computer-readable storage device, such as a non-transitory computer-readable storage medium, that includes instructions that, when executed by one or more processors, cause the one or more processors to perform operations for validation of a deployed software release associated with multiple development stages. The operations include receiving one or more files of the deployed software release and validation information including data components associated with a development process that includes the multiple development stages. The operations also include accessing a secure data structure and a public key associated with the development process. The secure data structure includes one or more digital signatures associated with the data components. The public key is associated with a private key used to generate the one or more digital signatures. The operations also include validating the one or more digital signatures by, for each of the one or more digital signatures included in the secure data structure, generating a validation signature based at least in part on the data component corresponding to the digital signature and the public key, and comparing the validation signature to the digital signature in the secure data structure. The operations further include processing the one or more files based on validation of the one or more digital signatures.

The foregoing has outlined rather broadly the features and technical advantages of the present disclosure in order that the detailed description that follows may be better understood. Additional features and advantages will be described hereinafter which form the subject of the claims of the present disclosure. It should be appreciated by those skilled in the art that the conception and specific implementations disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying figures, in which.

Figure 1:
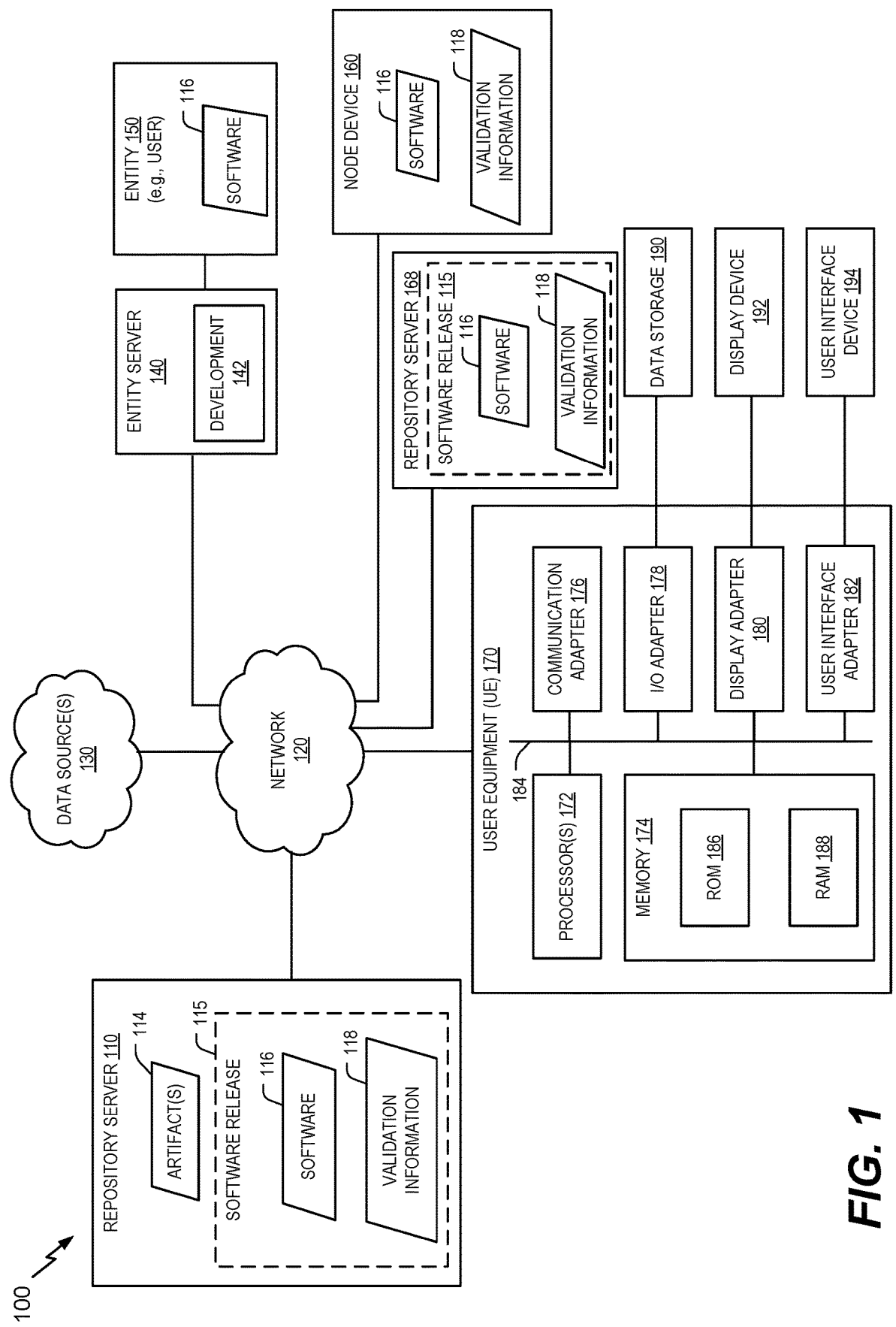
FIG. 1 is a block diagram of an example of a system that includes a server for sharing validation information of a software release.

Although the present disclosure and its advantages have been described in detail, it should be understood that various changes, substitutions and alterations can be made herein without departing from the scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

DETAILED DESCRIPTION

Inventive concepts of the present disclosure utilize a system to share validation information and to verify completion of a development process by a software release and to validate information generated during the development process. To illustrate, a software release (e.g., one or more files or artifacts) may undergo a development process, at an entity device or a server, that includes multiple development stages. Upon completion of at least a portion of the development process, data components for the portion of development process may be generated, such as head data, stage data (also referred to as "run data,") for one or more of the multiple development stages, development completion data (also referred to as "run component data"), or a combination thereof. As a non-limiting example, the head data may include configuration data associated with the development process, or stage data for a development stage may include inputs, outputs, start times, end times, authors, success indications, and/or other information associated with the development stage. A server may generate a digital signature for the data components based on the respective data component and a private key of a private/public key pair. For example, a first digital signature may be generated based on head data from an initiation of the development process and a private key, a second digital signature may be generated based on stage data from a unit test (or other development stage) and the private key, and a third digital signature may be generated based on stage data from an integration test (or other development stage) and the private key. The private/public key pair (e.g., the private key and a corresponding public key) may be generated based on a master key and may only be used to generate the digital signatures. The data components may be aggregated and converted to a string, or another data type, for use in generating the digital signature, or a hash value may be generated based on the data component and the hash value may be used to generate the digital signature. The digital signatures may be stored in a secure data structure that is immutable to other devices without the private key. The secure data structure may be implemented as a distributed data structure, such as a private blockchain, a tree structure, or the like. After completion of the development process, and storage of all the digital signatures in the secure data structure, the private key may be discarded, transitioning the secure data structure from append-only to read-only (e.g., via a public key).

The data components may be transferred as validation data along with the software release from the server to one or more node devices, which are also able to access the secure data structure and the public key. Transmission of the validation information enables the one or more node devices to verify that the software release (e.g., the one or more files) has successfully completed the multiple development stages of the development process and to validate that the data components are accurate and have not been tampered with after completion of the development process. For example, the server may deploy the software release by transmitting the one or more files (or the files that are not already stored at the one or more node devices) together with the validation information, and other metadata. Based on receipt of the validation information, the one or more node devices may validate the one or more files and the data components. For example, a node device may generate a first validation signature based on a first data component and the public key, and the node device may compare the first validation signature to a first digital signature stored in the secure data structure. If the first validation signature matches the first digital signature, the node device may validate that the first data component is accurate. Validating each of the data components in this manner verifies that the one or more files completed the respective development stages of the development process and validates that the received data components are accurate and have not been altered by a malicious actor.

Based on verifying that the one or more files have completed the multiple development stages/development process and that the data components are validated, the node device may process the one or more files. For example, the node device may transfer the one or more files from a transaction directory to another memory location for execution and setting a flag to indicate that the one or more files have completed the multiple development stages/development process. If the node device is unable to verify that the one or more files have completed the multiple development stages/development process and validate the data components, the node device may send a notification to the server and/or delete (or otherwise discard) the one or more files from the transaction directory. Thus, the node device may advantageously verify whether a software release has completed the multiple development stages of the development process and validate the data components before processing the software, thereby preventing the node device from processing unverified software, which may open the node device to vulnerabilities. Stated another way, the node device is able to verify that the same software that passed a development stage is the software that is received, and that the software has not been altered since the software passed the development stage.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may comprise a machine- or machines-executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions that may be organized as an object, procedure, or function. Nevertheless, the executables of an identified module need not be physically located together, but may comprise disparate instructions stored in different locations that, when joined logically together, comprise the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that aspects of the disclosure may be practiced without one or more of the specific details, or with other methods, components, materials, and so forth. In other instances, well-known structures, materials, or operations are not shown or described in detail to avoid obscuring aspects of the disclosure.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or. Similarly, the phrase "A, B, C, or a combination thereof" or "A, B, C, or any combination thereof" includes A alone, B alone, C alone, a combination of A and B, a combination of A and C, a combination of B and C, or a combination of A, B, and C.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any embodiment of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

Referring to FIG. 1, a block diagram of a system that includes a server for sharing validation information of a software release according to one or more aspects is shown and designated 100. System 100 includes a server 110 (e.g., a first repository server), a network 120, data sources 130, an entity server 140, an entity 150, a node device 160, a server 168 (e.g., a second repository server), and user equipment 170.

Server 110 may include one or more servers that, according to some implementations, are configured to perform several of the functions and/or operations described herein. One or more of the servers comprising server 110 may include memory, storage hardware, software residing thereon, and one or more processors configured to perform functions associated with system 100, as described further herein at least with reference to FIGS. 2-4. One of skill in the art will readily recognize that different server and computer architectures can be utilized to implement server 110, and that server 110 is not limited to a particular architecture so long as the hardware implementing server 110 supports the functions of the system disclosed herein. As shown in FIG. 1, user equipment can be used to enable an owner and/or administrator of server 110 to access and modify aspects (e.g., instructions, applications, data) of server 110. For example, components comprising user equipment 170, such as one or more processors 172, can be used to interface with and/or implement the server 110. Accordingly, user equipment 170 (e.g., a user station) may serve as a repository portal by which a user may access a repository system, such as a universal artifact repository, disclosed herein. For example, an artifact repository system may include server 110 (e.g., a first server) and server 168 (e.g., a second server). The portal can function to allow multiple users, inside and outside system 100 (e.g., at multiple instances of user equipment 170), to interface with one another. Additionally, it is noted that the one or more components described with reference to user equipment 170 may also be included in one or more of server 110, entity server 140, entity 150, node device 160, and/or server 168.

As shown, server 110 includes one or more artifacts 114 and software release 115. Artifacts 114 may include one or more binaries (e.g., a computer file that is not a text file). The artifacts may correspond to one or more package types. For example, a first artifact may correspond to a first package type, such as Maven, and a second artifact may correspond to a second package type, such as Bower. Software release 115 may include software 116 (e.g., one or more of artifacts 114) and software release information that includes validation information 118. Validation information 118 may include stage data, a public key, and a secure data structure that stores one or more digital signatures. Each digital signature in the secure data structure and each piece of stage data (also referred to as run data) may correspond to a development stage of multiple development stages of a development process of software 116. For example, as described further herein, software 116 may be generated by entity 150 and/or entity server 140, or by server 110, by undergoing multiple development stages. The multiple digital signatures may indicate successful completion of a corresponding development stage, the stage data may be generated during completion of a corresponding development stage, and the stage data and digital signatures may be used by node device 160 to verify completion of the multiple development stages and to validate the received stage data, as further described herein.

Network 120, such as a communication network, may facilitate communication of data between server 110 and other components, servers/processors, and/or devices. For example, network 120 may also facilitate communication of data between server 110 and one or more data sources 130, entity server 140, a node device 160, server 168, or any combination therefore. Network 120 may include a wired network, a wireless network, or a combination thereof. For example, network 120 may include any type of communications network, such as a direct PC-to-PC connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate.

Data sources 130 include the sources from which server 110 collects information. For example, data sources may include one or more reciprocities of artifacts, such as open source artifacts, vulnerability data, and/or license data, as illustrative, non-limiting examples.

Entity server 140 may include one or more servers which entity 150 uses to support its operations. In some implementations, entity server 140 may support a development process 142 that includes multiple development stages for generating software for a software release. In such implementations, entity 150 includes or is configured to generate (or initiate generation of) software 116 (e.g., one or more files). Software 116 includes one or more files (e.g., artifacts) to be included in a software release. For example, software 116 may correspond to a build job generated by a continuous integration/continuous delivery (CI/CD) pipeline. In some implementations, after performance of development process 142, entity 150 provides software 116, or software information indicating the files included in software 116, to server 110. In other implementations, entity 150 provides a query and/or one or more parameters for a query which is performed by server 110 to generate the software information at server 110. To illustrate, entity 150 may initiate a query by server 110 to identify one or more files corresponding to a particular build job identifier. The software information may be used to generate a software release, as further described herein.

Entity 150 may include any individual, organization, company, corporation, department (e.g., government), or group of individuals. For example, one entity may be a corporation with retail locations spread across multiple geographic regions (e.g., counties, states, or countries). As another example, another entity may be a corporation with cruise ships. As another example, another entity may be a group of one or more individuals. In a particular implementation, entity 150 includes a business and at least one user who can access server 110. For example, the user may access server 110 via an application, such as an application hosted by server 110. To illustrate, the user may have an account (e.g., on behalf of entity 150) and may log in to server 110 via the application. Although system 100 shows one entity 150, in other implementations, system 100 includes multiple entities. In a particular implementation, the multiple entities may include a first entity and a second entity, as described further herein at least with reference to FIG. 2. In such implementations, the first entity and the second entity may be the same entity (e.g., part of the same company) or may be different entities.

Node device 160 includes software 116 and software release information that includes validation information 118 (including data components such as head data, stage data, development completion data, or the like). A public key and a secure data structure storing one or more digital signatures may be made accessible to one or more devices, such as node device 160, or optionally be included in validation information 118. To illustrate, software (e.g., packages) hosted at node device 160 may be part of a software release which is a secure and immutable collection of software packages that make up a software release. Node device 160 also includes validation information 118, for use in verifying that software 116 has completed at least a portion of (e.g., one or more of the multiple development stages of) development process 142, that the received data components are valid, and that software 116 and the stage data have not been altered by another party, as further described herein with reference to FIGS. 2-4.

In some implementations, node device 160 may include or correspond to entity 150. Although system 100 is shown as having one node device 160, in other implementations, the system 100 may include multiple node devices (e.g., 160). Node device 160 may include a data center, a point-of-sale device, a mobile device, or an Internet of things (IoT) device. In some implementations, node device 160 includes a communications device, a fixed location data unit, a mobile location data unit, a mobile phone, a cellular phone, a satellite phone, a computer, a tablet, a portable computer, a wearable device, a display device, a media player, or a desktop computer. Alternatively, or additionally, node device 160 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, an augmented reality (AR) device, a virtual reality (VR) device, an extended reality (XR) device, a digital video disc (DVD) player, a portable digital video player, a satellite, a vehicle or a device integrated within a vehicle, any other device that includes a processor or that stores or retrieves data or computer instructions, or a combination thereof. In other illustrative, non-limiting examples, node device 160 may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Server 168 may be a repository server and may include or correspond to server 110. In some implementations, server 110 and server 168 may be included in a universal artifact management system. Server 110 and server 168 may execute different environments while sharing artifacts 114. In some implementations, server 168 receives software release 115 (e.g., software 116 and software release information including validation information 118) and supplies software release 115 to node device 160.

With respect to user equipment 170, user equipment 170 may include one or more processors 172, memory 174, a communication adapter 176, an input/output (I/O) adapter 178, a display adapter 180, a user interface adapter 182, and a bus 184. As shown, each of one or more processors 172, such as a central processing unit (CPU), memory 174, communication adapter 176, I/O adapter 178, display adapter 180, and user interface adapter 182 are coupled to/via bus 184. As noted above, one or more components of user equipment 170 may also be included in one or more other devices, such as server 110, to enable and/or support operations and functionality at the other device.

One or more processors 172 may include a CPU or microprocessor, a graphics processing unit ("GPU"), and/or microcontroller that has been programmed to perform the functions of user equipment 170. Implementations described herein are not restricted by the architecture of one or more processors 172 so long as one or more processors 172, whether directly or indirectly, support the operations described herein. One or more processors 172 may be one component or multiple components that may execute the various described logical instructions.

Memory 174 includes read only memory (ROM) 186 and random access memory (RAM) 188. ROM 186 may store configuration information for booting user equipment 170. ROM 186 can include programmable read-only memory (PROM), erasable programmable read-only memory (EPROM), electrically erasable programmable read-only memory (EEPROM), optical storage, or the like. User equipment 170 may utilize RAM 188 to store the various data structures used by a software application. RAM 188 can include synchronous RAM (SRAM), dynamic RAM (DRAM), synchronous dynamic RAM (SDRAM), or the like. ROM 186 and RAM 188 hold user and system data, and both ROM 186 and RAM 188 may be randomly accessed. In some implementations, memory 174 may store the instructions that, when executed by one or more processor 172, cause the one or more processors 172 to perform operations according to aspects of the present disclosure, as described herein.

Communications adapter 176 can be adapted to couple user equipment 170 to a network, which can be one or more of a LAN, WAN, and/or the Internet. Therefore, in some aspects, server 110 may be accessed via an online portal. I/O adapter 178 may couple user equipment 170 to one or more storage devices 190, such as one or more of a hard drive, a solid state storage device, a flash drive, a compact disc (CD) drive, a floppy disk drive, a tape drive, and/or the like. Also, data storage devices 190 can be a separate server coupled to user equipment 170 through a network connection to I/O adapter 178. Display adapter 180 can be driven by one or more processors 172 to control presentation via display device 192. In some implementations, display adapter 180 may display a graphical user interface (GUI) associated with a software or web-based application on display device 192, such as a monitor or touch screen. User interface adapter 182 couples user interface device 194, such as a keyboard, a pointing device, and/or a touch screen to the user equipment 170. The I/O adapter 178 and/or the user interface adapter 182 may, in certain aspects, enable a user to interact with user equipment 170. Any of devices 172-184 may be physical and/or logical.

The concepts described herein are not limited to the architecture of user equipment 170. Rather, user equipment 170 is provided as an example of one type of computing device that can be adapted to perform the functions of server 110 and/or a user interface device. For example, any suitable processor-based device can be utilized including, without limitation, personal data assistants (PDAs), tablet computers, smartphones, wearable devices, computer game consoles, multi-processor servers, and the like. Moreover, the systems and methods of the present disclosure can be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. Additionally, it should be appreciated that user equipment 170, or certain components thereof, may reside at, or be installed in, different locations within system 100.

In some implementations, server 110 (and/or server 168) can comprise a server and/or cloud-based computing platform configured to perform operations and/or execute the steps described herein. Accordingly, server 110 (and/or server 168) may include a particular purpose computing system designed, configured, or adapted to perform and/or initiate operations, functions, processes, and/or methods described herein and can be communicatively coupled with a number of end user devices (e.g., user equipment 170), which can be, e.g., a computer, tablet, smartphone, wearable device, or other similar end user computing device. Users can interact with server 110 (and/or server 168) using a device via one or more networks, such as network 120, which itself can comprise one or more of a local intranet, a Local Area Network (LAN), a Wide Area Network (WAN), a virtual private network (VPN), and the like. As will be apparent to those of skill in the art, communicative coupling between different devices of system 100 can be provided by, e.g., one or more of wireless connections, a synchronous optical network (SONET) connection, a digital T1, TN, E1 or E3 line, Digital Data Service (DDS) connection, DSL (Digital Subscriber Line) connection, an Ethernet connection, and the like.

Figure 2:
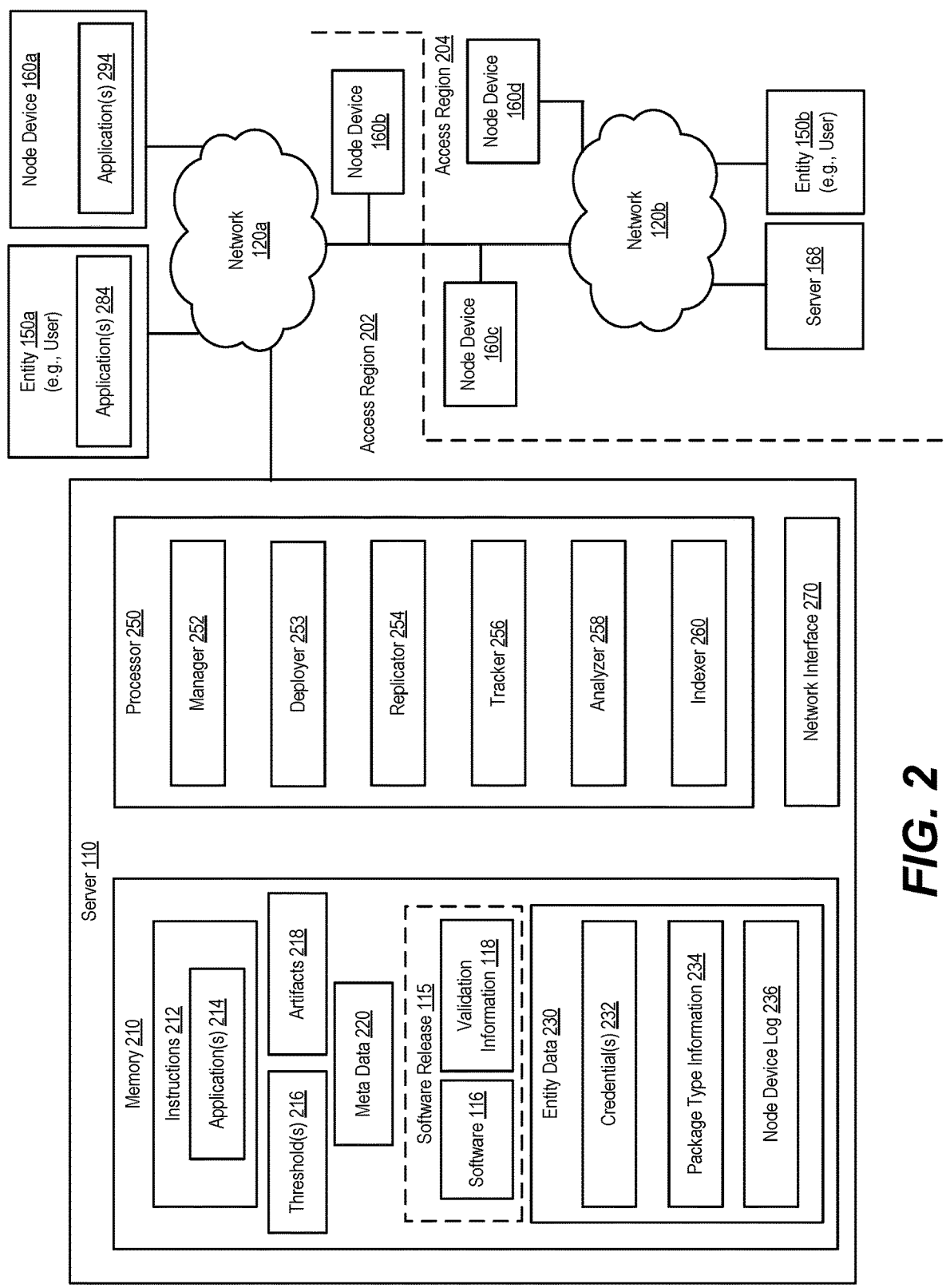
FIG. 2 is a block diagram of another example of a system for sharing validation information of a software release.

Referring to FIG. 2, a block diagram of a system for sharing validation information of a software release according to one or more aspects is shown as a system 200. System 200 may include or correspond to at least a portion of system 100. System 200 includes server 110, networks 120a, 120b, entities 150a, 150b, node devices 160a, 160b, 160c, 160d, and server 168. As shown in FIG. 2, system 200 is spread across multiple regions, such as a first region 202 and a second region 204. For example, each region may correspond to a different city, county, state, country, continent, or other physical or logical distinction. To illustrate, first region 202 may include or correspond to North America (e.g., the United States) and second region 204 may include or correspond to Asia (e.g., Japan), as a non-limiting example.

As shown, server 110 is included in first region 202 and server 168 is included in second region 204. Server 168 may be a repository server and may include or correspond to server 110. In some implementations, server 110 and server 168 may be included in a universal artifact management system. Networks 120a, 120b may include or correspond to network 120 of FIG. 1. Each of the entities 150a, 150b may include or correspond to entity 150 of FIG. 1. In some implementations, a first entity 150a and a second entity 150b may be part of the same group, company, etc., or may be part of different groups, companies, etc. Each of node devices 160a, 160b, 160c, 160d may include or correspond to node device 160 of FIG. 1. In some implementations, each of node devices 160a, 160b, 160c, 160d corresponds to the same entity. In other implementations, at least one node device of node devices 160a, 160b, 160c, 160d corresponds to another entity.

Server 110 may include a memory 210 (e.g., one or more memory devices), one or more processors 250, and a network interface 270. Network interface 270 may be configured to be communicatively coupled, via one or more networks (e.g., 120a, 120b) to one or more external devices, such as one or more entities (e.g., 150a, 150b), one or more node devices (e.g., 160a, 160b, 160c, 160d), one or more servers (e.g., 168), one or more data sources (e.g., 130), or any combination thereof. For example, network interface 270 may include a transmitter, a receiver, or a combination thereof (e.g., a transceiver).

Memory 210 may include ROM devices, RAM devices, one or more HDDs, flash memory devices, SSDs, other devices configured to store data in a persistent or non-persistent state, or a combination of different memory devices. Memory 210 includes (e.g., is configured to store) instructions 212, thresholds 216, artifacts 218 (e.g., binaries), meta data 220, software release 115, and entity data 230. For example, memory 210 may store instructions 212, that when executed by one or more processors 250, cause the processor 250 to perform functions, methods, processes, and/or operations as described further herein. In some implementations, instructions 212 may include or be arranged as an application 214 (e.g., a software program) associated with a universal artifact repository. For example, application 214 may provide a portal via which one or more entities and/or users interact with and access server 110. Application 284 at entity 150*a* and application 294 at node device 160*a* are configured to enable entity 150*a* and node device 160*a* to communicate with and/or access server 110. In some implementations, each of application 284 and application 294 enable functionality as described with respect to server 110. In other implementations, application 284 and application 294 may enable and/or support less than all of the functionality as described with reference to server 110. To illustrate, application 294 may not provide functionality as described with reference to analyzer 258.

In some implementations, memory 210 includes multiple memories accessible by one or more processors 250. In some such implementations, one or more of the memories may be external to server 110. To illustrate, at least one memory may include or correspond to a database accessible to server 110, such as a database that stores one or more thresholds 216, artifacts 218, meta data 220, software release 115, entity data 230, or any combination thereof. In some implementations, memory 210 may include or be coupled to cloud storage such that one or more thresholds 216, one or more of artifacts 218, meta data 220, software release 115, and/or entity data 230 is stored at a cloud storage location and accessible by server 110.

Thresholds 216 may include or correspond to one or more thresholds, such as a time period threshold, a size threshold, etc. Artifacts 218 may include or correspond to artifacts 114 of FIG. 1. Meta data 220 may include meta data for artifacts 114, meta data for application 214, meta data for one or more files (e.g., 116), meta data for validation information, or any combination thereof. Meta data for an artifact (e.g., 114) may include a file name, a file size, a checksum of the file, and/or one or more properties that annotate the artifact, such as when the artifact was created by a build, a build job name, an identifier of who initiated the build, a time the build was initiated, a build agent, a CI server, a build job number, and/or a quality assurance test passed indicator, as illustrative, non-limiting examples.

Software release 115 includes software 116 and software release information. Software release information includes information corresponding to software 116, such as one or more checksums, meta data, or a combination thereof. The software release information may also include validation information 118. Software 116 may include one or more files (e.g., one or more of artifacts 218), and may correspond to a build job. Software 116 may be designated for distribution to entity or node devices as part of software release 115. Validation information 118 includes data components, such as head data, stage data, and/or development completion data (and optionally a public key and a secure data structure that stores one or more digital signatures, or the public key and secure data structure may be otherwise accessible to devices such as node device). The data components may include information generated by or associated with general parameters of a development process and/or information associated with one or more development stages, such as configuration data, inputs, outputs, an author associated with the development stage (or of the signature), a start time of the development stage, an end time of the development stage, an indicator of success for the development stage, a time of the signature, a date of the signature, a development stage or other component associated with the signature, etc. The public key may be part of a private/public key pair and may enable generation of validation signatures by node devices. The secure data structure may be any data structure, such as a private blockchain, a tree structure, or the like, that is immutable to devices other than server 110 and that is configured for storage of information in a serial order (e.g., a second entry in the secure data structure is based at least in part on a first entry in the secure data structure) or in hierarchical order.

Entity data 230 may include data associated with one or more entities. For example, entity data 230 may include or correspond to one or more of entity 150*a*, 150*b*. Entity data 230 may include one or more credentials 232, package type information 234, and a node device log 236. Credentials 232 include login information to enable one or more users and/or one or more entities to access server 110. Additionally, or alternatively, credentials 232 may include security or authentication information, such as a private key, a public key, and/or a token of a user and/or entity. Package type information 234 may identify one or more package types used by the corresponding entity. As illustrative, non-limiting examples, the one or more package types may include Bower, Chef, CocoaPods, Conan, Conda, CRAN, Debian, Docker, Git LFS, Go, Helm, Maven, npm, NuGet, Opkg, P2, PHP Composer, Puppet, PyPI, RPM, RubyGems, SBT, Vagrant, and VCS. Node device log 236 includes node device information of one or more node devices corresponding to an entity of entity data 230. To illustrate, node device log 236 may include topology information (e.g., location information) of one or more node devices, one or more node device identifiers, owner/manager information, file and/or software information (e.g., name, version number, size, etc.) installed at one or more node devices, or any combination thereof, as illustrative, non-limiting examples. In some implementations, node device log 236 may indicate a list of target nodes at which one or more security objects are to be synchronized or software release 115 is to be deployed.

Processor 250 may include may be a CPU (e.g., processor 172) or microprocessor, a graphics processing unit ("GPU"), a field-programmable gate array (FPGA) device, an application-specific integrated circuits (ASIC), another hardware device, a firmware device, a microcontroller, or any combination thereof that has been programmed to perform the functions described herein. As shown in FIG. 2, in some implementations, server 110 (e.g., processor 250) may include a manager 252, a deployer 253, a replicator 254, a tracker 256, an analyzer 258, and an indexer 260. In some implementations, processor 250 may include one or more modules. For example, each of manager 252, deployer 253, replicator 254, tracker 256, analyzer 258, and indexer 260 may include or correspond to one or more modules. In some implementations, server 110 (e.g., processor 250 or modules 252, 253, 254, 256, 258, 260) may be configured to execute one or more routines that perform various operations as described further herein. A module is "[a] self-contained hardware or software component that interacts with a larger system." Alan Freedman, "The Computer Glossary" 268 (8th ed. 1998). A module may comprise a machine- or machines-executable instructions. A module may also be implemented in programmable hardware devices such as field programmable gate arrays, programmable array logic, programmable logic devices or the like. Modules may also include software-defined units or instructions, that when executed by a processing machine or device, transform data stored on a data storage device from a first state to a second state. Modules may be separate or two or more may be combined.

In some implementations, one or more of modules (e.g., 252, 253, 254, 256, 258, 260) may locally reside in memory 210 or in a separate location. Further, as will be understood by those of skill in the art, a "module" can include an application-specific integrated circuit ("ASIC"), an electronic circuit, a processor (shared, dedicated, or group) that executes one or more of software or firmware, a combinational logic circuit, and/or other suitable components that provide the described functionality.

Referring to processor 250, manager 252 may be configured to enable a user (e.g., 150a) to manage one or more other components/modules (e.g., 253, 254, 256, 258, 260) of processor 250. Additionally, or alternatively, manager 252 may enable storage of and/or access to one or more of artifacts 218. In some implementations, manager 252 may enable administration of multiple instances of a user account, such as a first instance at server 110 and a second instance at server 168. Accordingly, manager 252 may be configured to operate as an administrative tool that enables an entity (e.g., 150a) to monitor and control a first instance of a user account (corresponding to first region 202) and a second instance of the user account (corresponding to second region 204). For example, the entity (e.g., 150a) may be able to see which services (e.g., 253, 254, 256, 258, 260) are operating in different regions, add/modify/remove individual users in different regions, set different permissions for individual users in different regions, provide and store one or more public keys, etc. In some implementations, manager 252 includes a manager module that includes one or more routines, executable by one or more processors (e.g., processor 172 of FIG. 1 or processor 250) to enable a user (e.g., 150a) to manage one or more other components/modules (e.g., 253, 254, 256, 258, 260) of processor 250, as described herein.

Deployer 253 may be configured to perform a software release distribution. For example, deployer 253 provides a secure and structured platform to distribute and release binaries as a single coherent release bundle to multiple remote locations and update them as new release versions are produced. A release bundle may include one or more files and/or release bundle information which includes or indicates a list of the one or more files (e.g., artifacts) to be included in the release bundle and meta data (e.g., properties) associated with the release bundle. For example, software release 115 may include software 116 (e.g., one or more files) and software release information which includes metadata corresponding to software 116. The release bundle information may include, for each file of the bundle release, a checksum (of the file), meta data (corresponding to the file), or both. In some implementations, the release bundle also includes additional meta data (e.g., file name, file size, path to the file, etc.) corresponding to the release bundle, such as a release bundle name, a version number, a source identifier, description information, release data, and/or a size. The software release information may also include validation information 118 which includes stage data, a public key, and a secure data structure that stores digital signatures and, in some implementations, digital signature metadata that corresponds to at least one of the digital signatures. Additionally, or alternatively, the software release information may include a signature (or other cryptography technique) to render the release bundle information immutable. In some implementations, the signature corresponding to the release bundle is different from the digital signatures (e.g., generated by development stages of the development process) stored in the secure data structure. In other implementations, one of the digital signatures stored in the secure data structure may be used to render the release bundle information immutable.

Deployer 253 may enable generation of a release bundle, auditing and traceability by tracking all changes associated with a release bundle distribution of the release bundle including permission levels release content, scheduling of a release bundle for distribution, tracking of a release bundle, stopping distribution of a release bundle, and/or selection of target destinations. Additionally, or alternatively, a software release may be provisioned amongst one or more node devices (e.g., 160a, 160b, 160c, 160d). In some implementations, as part of the release flow, release bundles are verified and validated by the source and/or destination to ensure that they are signed correctly and safe to use. In some implementations, deployer 253 includes a deployer module that includes one or more routines, executable by one or more processors (e.g., the processor 172 of FIG. 1 or processor 250) to perform a software release distribution.

Replicator 254 may be configured to coordinate and provide one or more artifacts (e.g., one or more files) and/or meta data between two or more devices. For example, replicator 254 may coordinate transfer of one or more artifacts (e.g., one or more files) and/or meta data between server 110 and server 168, between server 110 and one or more of node devices 160a, 160b, 160c, 160d, or both. In some implementations, replicator 254 is configured to be used in conjunction with deployer 253 to distribute a software release, provide efficient network utilization by optimizing replication, and reduce network load and/or release bundle synchronization time from source device (e.g., server 110) to target instance (e.g., server 168) or node device (e.g., 160a, 160b, 160c, 160d). Additionally, or alternatively, replicator 254 may be configured to identify a difference between at least one file stored at a first device (e.g., server 110) and one or more files stored at a second device (e.g., server 168 or one of node devices 160a, 160b, 160c, 160d), and initiate transfer of at least one or more portions of a file to the second device. In some implementations, replicator 254 includes a replicator module that includes one or more routines, executable by one or more processors (e.g., the processor 172 of FIG. 1 or processor 250) to coordinate and provide one or more artifacts (e.g., one or more files) and/or meta data between two or more devices.

Tracker 256 may be configured to track one or more artifacts, meta data, one or more release bundles, or any combination thereof deployed or attempted to be deployed to a node device, such as one or more of node devices 160a, 160b, 160c, 160d, a server (e.g., server 110, 168), or both. In some implementations, tracker 256 includes a tracker module that includes one or more routines, executable by one or more processors (e.g., the processor 172 of FIG. 1 or processor 250) to track one or more artifacts, meta data, one or more release bundles, or any combination thereof deployed or attempted to be deployed to a node device, such as one or more of node devices 160a, 160b, 160c, 160d, and/or one or more servers (e.g., server 110, 168).

Analyzer 258 may be configured to analyze one or more artifacts (e.g., 218) and/or meta data (e.g., 222) to identify a vulnerability corresponding to the one or more artifacts, determine license compliance of the one or more artifacts, and/or determine an impact of an issue with a deployed file (e.g., artifact). In some implementations, analyzer 258 is configured to analyze data stored at memory 210, identify issues related to deployed software, perform recursive scanning, and perform an impact analysis. In some implementations, analyzer 258 includes an analyzer module that includes one or more routines, executable by one or more processors (e.g., the processor 172 of FIG. 1 or processor 250) to analyze one or more artifacts (e.g., 218) and/or meta data (e.g., 222) to identify a vulnerability corresponding to the one or more artifacts, determine license compliance of the one or more artifacts, and/or determine an impact of an issue with a deployed file (e.g., artifact).

Indexer 260 may be configured to provide an indexing capability, including maintaining interdependencies and information, for one or more package types. Additionally, or alternatively, indexer 260 is configured to generate meta data (e.g., 220), such as meta data defined by a universal artifact repository manager and utilized by one or more of manager 252, deployer 253, replicator 254, tracker 256, and analyzer 258. In some implementations, indexer 260 includes an indexer module that includes one or more routines, executable by one or more processors (e.g., the processor 172 of FIG. 1 or processor 250) to provide an indexing capability, including maintaining interdependencies and information, for one or more package types.

In some implementations, one or more of modules 252-260 may be optional. For example, in some implementations in which server 110 is configured to distribute software releases but not otherwise manage artifacts or files, processor 250 may include deployer 253 and manager 252. In some other implementations, processor 250 may include multiple or all of modules 252-260, and server 110 may be configured to deploy software releases in addition to operate as a universal artifact repository.

Figure 3:
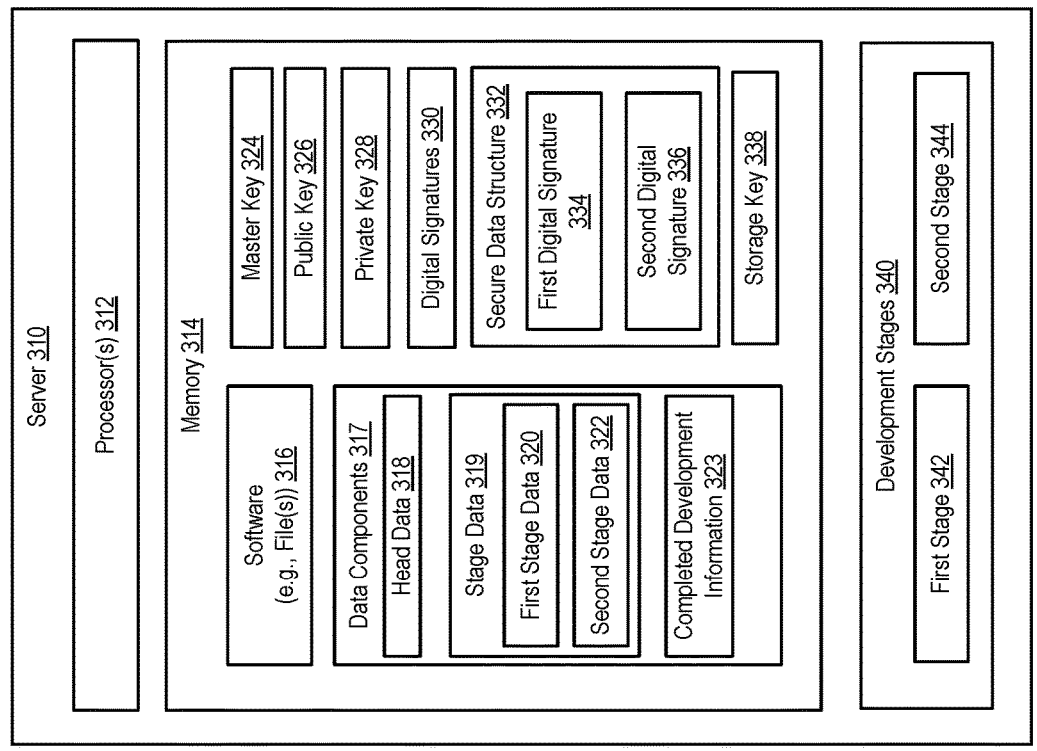
FIG. 3 is a block diagram of another example of a system for sharing validation information of a software release.
Figure 3:
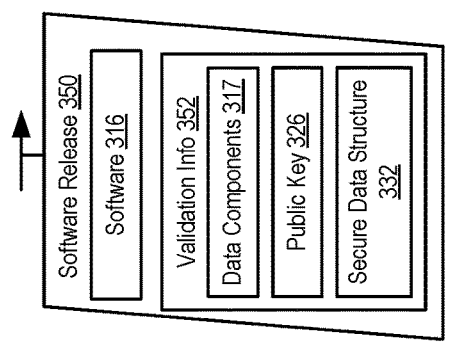
Figure 3:
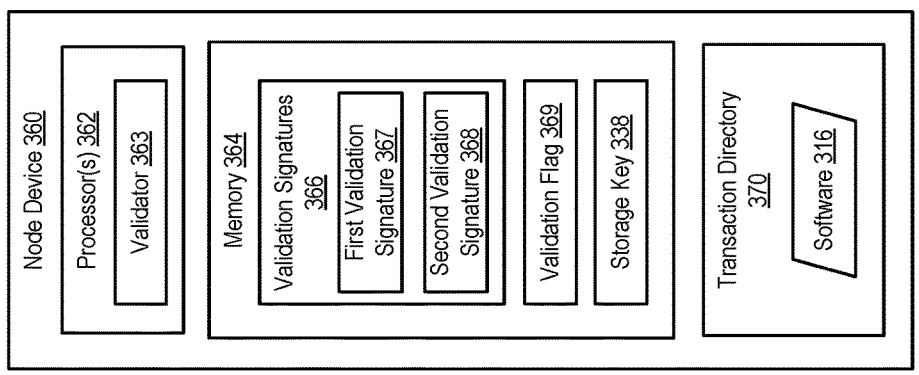
Figure 4:
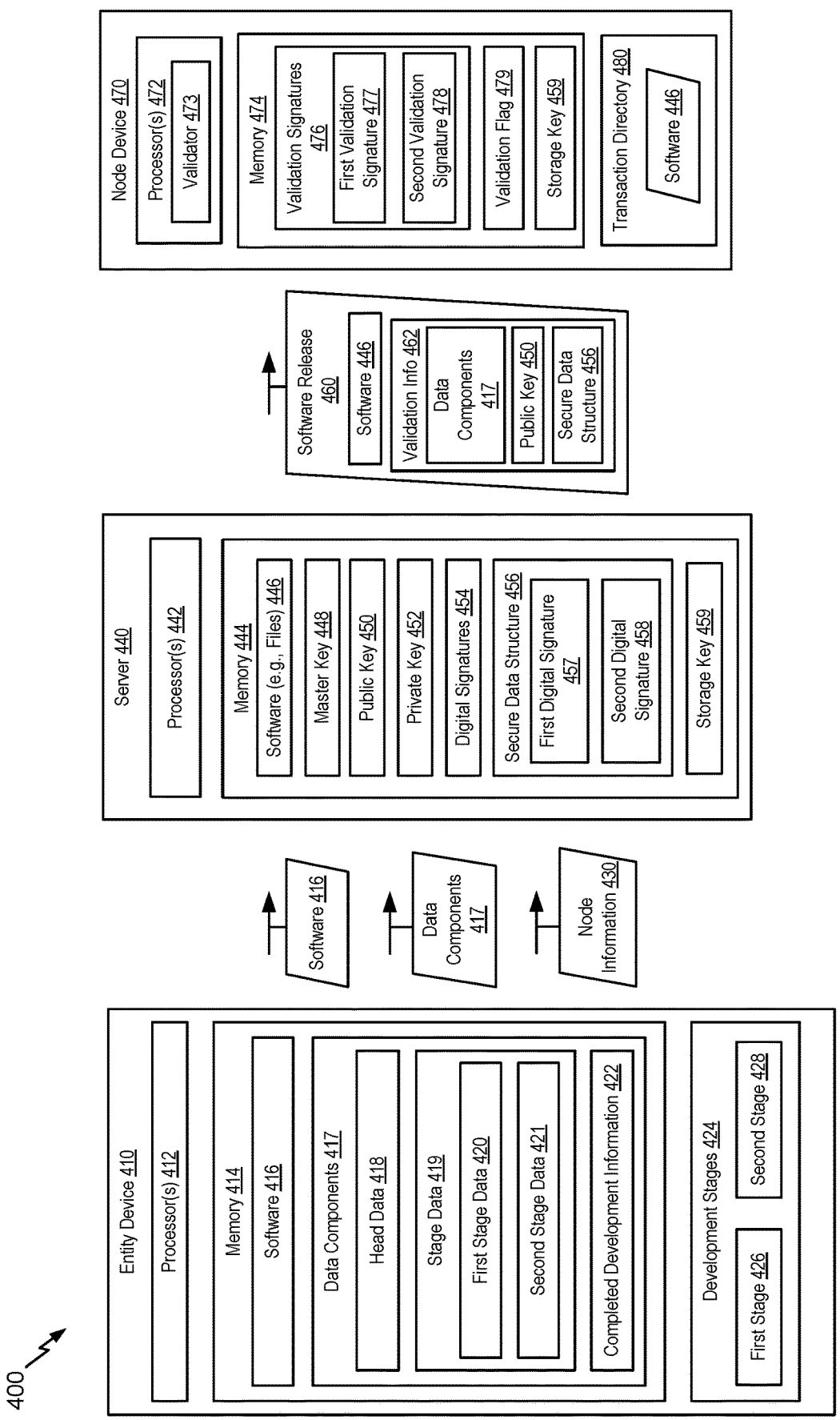
FIG. 4 is a block diagram of another example of a system for sharing validation information of a software release.

FIGS. 3-4 are block diagrams of systems for sharing validation information of a software release according to one or more aspects. In some implementations shown in FIGS. 3-4, the system of FIG. 3 includes a server that is configured to perform multiple development stages of a development process for a software release, and the system of FIG. 4 includes a server that receives stage data and software from an entity device configured to perform multiple development stages of a development process for a software release.

Referring to FIG. 3, a block diagram of a system for sharing validation information of a software release according to one or more aspects is shown and designated 300. System 300 may include or correspond to at least a portion of system 100 and/or system 200. System 300 includes a server 310 and a node device 360. Server 310 and node device 360 may be coupled via one or more networks, such as network 120. Server 310 may include or correspond to server 110, server 168, or a combination thereof. Node device 360 may include or correspond to node device 160, 160a, 160b, 160c, or 160d.

Server 310 includes one or more processors 312 and a memory 314. Memory 314 may include or correspond to memory 210. Memory 314 includes software 316 (e.g., one or more files/artifacts), data components 317, a master key 324, a public key 326, a private key 328, digital signatures 330, a secure data structure 332, and optionally a storage key 338. The software 316 may include or correspond to software 116 and may include one or more of artifacts 114 and/or artifacts 218. Data components 317 include data generated by initiation of a development process for a software release (e.g., for software 316) or during performance of one or more development stages of the development process. For example, data components 317 may include head data 318, stage data 319, completed development information 323, or a combination thereof. Head data 318 includes general parameters and data generated or available at initiation of the development process, such as name and version information as well as a full configuration data at the time the development process is initiated. Stage data 319 includes data generated during performance of one or more of the development stages, such as configuration data associated with the development stage, one or more inputs to the development stage, one or more outputs from the development stage, a start time for the development stage, an end time for the development stage, one or more authors associated with the development stage, a success indicator (e.g., a pass/fail indicator) for the development stage, or any combination thereof. In some implementations, stage data 319 includes first stage data 320 and second stage data 322. In some other implementations, more than two stage data may be included in stage data 319. Completed development information 323 (e.g., run component data) includes a completion time and references to each of the other data components/run components, such as an ordered list of hashes of head data 318 and stage data 319.

Master key 324 may include or correspond to a cryptographic key associated with a universal artifact repository or software release deployment supported by server 310. Public key 326 and private key 328 include or correspond to keys generated by server 310 (e.g., processor 312) based on master key 324, and may be part of a public/private key pair. Digital signatures 330 may include digital signatures generated based on data components 317 and private key 328, as further described herein. Secure data structure 332 includes or corresponds to a secure data structure that is immutable to other devices and is configured for serial addition of entries. To illustrate, each subsequent entry of secure data structure 332 may be based at least in part on a previous entry of secure data structure 332. In some implementations, secure data structure 332 includes or corresponds to a private blockchain. Alternatively, secure data structure 332 may include or correspond to a tree structure, or the tree structure may be stored in the private blockchain, as further described herein. Secure data structure 332 may be configured to store digital signatures 330 for transmission to other devices, such as node device 360. In some implementations, secure data structure 332 stores a first digital signature 334 and a second digital signature 336. In some other implementations, secure data structure 332 stores more than two digital signatures. Storage key 338 includes or corresponds to a cryptographic key used by server 310 to encrypt data for transmission to other devices. In some implementations, storage key 338 includes master key 324. In some other implementations, storage key 338 is distinct from master key 324, such as based on master key 324 or otherwise generated or received by server 310. Additionally, memory 314 may include instructions (not shown) that are executable by processor 312 to cause processor 312 to perform one or more operations. In some implementations, the instructions may include or be arranged as an application, such as application 214 (e.g., a software program).

Server 310 also includes multiple development stages 340. The development stages are of a development process for software (e.g., 316), and include development stages such as building, unit tests, integration tests, and assembly, as non-limiting examples. In some implementations, development stages 340 include a first development stage 342 and a second development stage 344. In some other implementations, more than two development stages may be included in development stages 340. In some implementations, development stages 340 correspond to a continuous integration/continuous delivery (CI/CD) pipeline for building and deploying the software release (e.g., software 316). Performance of the development stages 340 may cause generation of stage data 319. For example, performance of first development stage 342 may cause generation of first stage data 320, and performance of second development stage 344 may cause generation of second stage data 322. Additionally, or alternatively, some of digital signatures 330 (e.g., digital signatures stored in secure data structure 332) may correspond to development stages 340. For example, first digital signature 334 may correspond to first development stage 342, and second digital signature 336 may correspond to second development stage 344. As another example, first digital signature 334 may correspond to head data 318 and second digital signature 336 may correspond to first development stage 342.

Although system 300 is described as including one server 310, in other implementations, system 300 may include multiple servers (e.g., 310) coupled to node device 360. Additionally, or alternatively, it is noted that server 310 (e.g., processor 312) may include one or more additional components or modules, such as manager 252, deployer 253, replicator 254, tracker 256, analyzer 258, and/or indexer 260, as illustrative, non-limiting examples.

Node device 360 includes one or more processors 362, a memory 364 (e.g., one or more memories), and a transaction directory 370. Transaction directory 370 may include or correspond to a storage device configured to receive and store one or more files. In some implementations, transaction directory 370 is distinct from memory 364. In other implementations, transaction directory 370 includes a logical or virtual portion of memory 364.

Memory 364 may include instructions (not shown) that are executable by processor 362 to cause processor 362 to perform one or more operations. In some implementations, the instructions may include or be arranged as an application, such as application 294 (e.g., a software program). Additionally, or alternatively, memory 364 may include one or more files (e.g., software), such as software corresponding to a release bundle.

Processor 362 includes a validator 363. Validator 363 is configured to verify whether software (e.g., one or more files) has successfully completed one or more of the multiple development stages of development stages 340. For example, validator 363 may verify that one or more files have successfully completed an initial development stage, an intermediate development stage, a final development stage, or multiple development stages, a portion of the development process, or an entirety of the development process. Additionally, or alternatively, validator 363 may validate that received data components are accurate, and that the one or more files and the data components have not been altered after completion of at least a portion of the development process. In some implementations, validator 363 includes a validator module that includes one or more routines, executable by one or more processors (e.g., the processor 172 of FIG. 1 or processor 362) to verify whether software has successfully completed at least a portion of the development process and validate whether the received data components are accurate.

Although system 300 is described as including one node device 360, in other implementations, system 300 may include multiple node devices (e.g., 360) coupled to server 310. Additionally, or alternatively, it is noted that node device 360 (e.g., processor 362) may include one or more additional components or modules, such as manager 252 and/or replicator 254, as illustrative, non-limiting examples.

During operation of system 300, server 310 performs the development process that includes development stages 340 on software 316 (e.g., one or more files). Successful initiation of the development process causes head data 318 to be generated, and successful completion of a development stage causes corresponding stage data of stage data 319 to be generated. For example, successful completion of first development stage 342 causes generation of first stage data 320. As another example, successful completion of second development stage 344 causes generation of second stage data 322. Head data 318 may include general development parameters associated with the development process (e.g., the pipeline run), such as configuration ("config") data at the time of initiation, a development process version number, an initiation time (e.g., a timestamp), an identifier (e.g., name) associated with the development process, a run number associated with the development process, details of a git command associated with the development process, or a combination thereof. In some implementations, the config data may include full pipeline yaml configuration data output as a string. Stage data corresponding to a particular development stage includes inputs to the particular development stage (e.g., outputs of a previous development stage), configuration data associated with or generated during the particular development stage (e.g., action flags, locations in a file system of actions or files to be acted on, registry names, document image names, and the like), outputs of the particular development stage (e.g., inputs to a subsequent development stage), information associated with the particular development stage (e.g., author(s) or trigger condition(s), start time, end time, build job number, and the like), additional data, or a combination thereof. For example, first stage data 320 may include configuration data associated with first development stage 342, one or more inputs to first development stage 342, one or more outputs from first development stage 342, a start time for first development stage 342, an end time for first development stage 342, one or more authors associated with first development stage 342, one or more trigger conditions of first development stage 342, a build job number associated with performance of first development stage 342, other information associated with first development stage 342, or any combination thereof. In some implementations, first development stage 342 corresponds to a unit test, and second development stage 344 corresponds to an integration test. In other implementations, first development stage 342 and second development stage 344 correspond to other development stages. Additionally or alternatively, completion of all of development stages 340 may cause generation of completed development information 323. Completed development information 323 may include a completion time (e.g., a timestamp) and run component information, which in some implementations includes an order list of hashes of head data 318 and all of stage data 319. In some implementations, any of head data 318, stage data 319, or completed development information 323 that include inputs and outputs that are artifacts may be saved as references to a corresponding hash and an original path at server 310. For example, an input may include BuildInfo and child PipeInfo, which may be saved as references to the corresponding hash and the original path for BuildInfo at server 310. In some implementations, data components 317 may each be stored as a string (e.g., a concatenation of all information associated with the data component in a string), which may be saved as a file such as a JSON file.

To use in generation of digital signatures, server 310 generates public key 326 and private key 328. Public key 326 and private key 328 may be included in a public/private key pair that is generated by server 310. For example, server 310 may generate the public/private key pair based on master key 324. In some implementations, private key 328, public key 326, or both, may include or correspond to Gnu Privacy Guard (GPG) keys or other types of encryption keys. To further illustrate, private key 328 (and corresponding public key 326) may be a "run key" that is generated within the CI/CD pipeline performing the development process that includes development stages 340, using master key 324 as a certificate (e.g., to sign private key 328 and public key 326). In some implementations, master key 324 includes or corresponds to a private and secure key that is maintained by server 310 and stored at memory 314 as part of supporting a universal artifact repository at server 310. Server 310 may generate and store public key 326 and private key 328 at memory 314 for use in generating digital signatures and for transmission to other devices.

Upon completion of a data component of the data components 317, server 310 generates a corresponding digital signature of digital signatures 330 using the corresponding data component and private key 328. For example, upon successful completion of head data 318, server 310 generates first digital signature 334 based at least in part on head data 318 and private key 328. As another example, upon successful completion of first development stage 342, server 310 generates second digital signature 336 based at least in part on first stage data 320 and private key 328. As another example, upon success completion of all of development stages 340, server 310 generates a final digital signature based on completed development information 323 and private key 328. As yet another example, a digital signature may be generated when an initial development stage is completed, a digital signature may be generated when an intermediate development stage is completed, and a digital signature may be generated when a final development stage is completed. In some implementations, at least one development stage can have two or more digital signatures (e.g., there may be different digital signatures for when different sets of files complete the same development stage). In some implementations, each digital signature may correspond to a software build job, such as a software build job of a CI/CD pipeline. For example, each digital signature of digital signatures 330 may represent successful completion by a software build job of a corresponding development stage (or the portion of the development process that corresponds to the data component). Each digital signature of digital signatures 330 may correspond to a respective one or more files (e.g., artifacts) or to an entirety of software 316 (e.g., one or more files). Additionally, or alternatively, regardless of the process used to generate digital signatures 330, each of digital signature of digital signatures 330 may be reproducible at another device, such as node device 360, using the corresponding data component and a key, such as public key 326, as further described herein.

In some implementations, server 310 generates digital signatures 330 using the corresponding data component (e.g., either an entirety or portion thereof). To illustrate, server 310 may "stringify" or otherwise package the corresponding data component, such as by serially ordering the corresponding data component and converting the ordered data component to a string, and server 310 may sign (e.g., encrypt) the string (or otherwise packaged) version of the corresponding data component using private key 328 to generate a corresponding digital signature. For example, server 310 may generate first digital signature 334 by signing a string (or other data type) corresponding to an entirety (or a portion) of head data 318 using private key 328. As another example, server 310 may generate second digital signature 336 by signing a string (or other data type) corresponding to an entirety (or a portion) of first stage data 320 using private key 328. In some implementations, server 310 generates a digital signature for each data component, including an initial component, each development stage of development stages 340, and completion of development stages 340, based on a corresponding data component and private key 328.

In some other implementations, server 310 generates digital signatures 330 using a value that is based on the corresponding data component (e.g., either an entirety or portion thereof). To illustrate, server 310 may generate a hash value (or other value) based on the corresponding data component, and server 310 may sign (e.g., encrypt) the hash value (or other value) using private key 328 to generate a corresponding digital signature. For example, server 310 may generate a first hash value based on an entirety (or a portion) of head data 318, and server 310 may generate first digital signature 334 by signing the first hash value using private key 328. As another example, server 310 may generate a second hash value based on an entirety (or portion) of first stage data 320, and server 310 may generate second digital signature 336 by signing the second hash value using private key 328. Any type of hash function or other one-way mapping function may be used, such as a Merkle-Damgård 5 (MD5) function, a secure hash algorithm 1 (SHA-1) function, a SHA-2 function, a RACE integrity primitives evaluation message digest (RIPEMD) function, an advanced encryption standard (AES) function, a SHA-3 function, a BLAKE2 function, or a BLAKE3 function, as non-limiting examples. In some implementations, server 310 generates a digital signature for each development stage of development stages 340 based on a hash value (or other value) based on stage data corresponding to the respective development stage and private key 328, in addition to digital signatures based on head data 318 and completed development information 323. Generating digital signatures 330 based on hash values (or other values) that are based on data components 317 may reduce the memory footprint associated with digital signatures 330.

After generating digital signatures 330, server 310 may store one or more digital signatures of digital signatures 330 in secure data structure 332. Secure data structure 332 may be configured to store one or more digital signatures and to be immutable to other devices. For example, entries, such as digital signatures, in secure data structure 332 are not retroactively alterable without subsequent alteration of all subsequent entries, which may require private key 328 (which is not accessible to other devices). In some implementations, secure data structure 332 may include or correspond to a private blockchain that is maintained by server 310 (e.g., a blockchain that is not distributed amongst multiple devices). Additionally, or alternatively, secure data structure 332 may be configured for serial addition of entries. To illustrate, each subsequent entry of secure data structure 332 may be based at least in part on the previous entry within secure data structure 332. For example, a subsequent entry in secure data structure 332 may include a cryptographic hash, or other information, that is based on a previous entry in secure data structure 332 and that links the subsequent entry to the previous entry. In some implementations, secure data structure 332 may include or correspond to a tree structure. For example, secure data structure 332 may be maintained as a tree, such as a binary using last odd leaf duplication (for trees with an odd number of leaves) or a Merkle mountain range (MMR) tree, as non-limiting examples. An MMR tree is a binary tree where each parent node is the concatenated hash of the two child nodes.

Server 310 may be configured to store digital signatures 330 in respective entries of secure data structure 332. For example, server 310 may add a first entry that includes first digital signature 334 to secure data structure 332. As another example, server 310 may add a second entry that includes second digital signature 336 and that is based at least in part on the first entry to secure data structure 332. To further illustrate, the second entry (that includes second digital signature 336) may include a cryptographic hash value, or other value, that is based on the first entry (that includes first digital signature 334). In some implementations, each entry in secure data structure 332 may include a digital signature for a respective data component and at least a portion of the data component. For example, the first entry of secure data structure 332 may include first digital signature 334 and at least a portion of head data 318. As another example, the second entry of secure data structure 332 may include second digital signature 336, a hash value based on the first entry, and at least a portion of first stage data 320. Additionally or alternatively, one or more entries in secure data structure 332 may be based on previous entries. To illustrate, in an example in which secure data structure 332 implements (or stores) a MMR tree, the first entry may correspond to head data 318, the second entry may correspond to first stage data 320, and another entry may be added that is a concatenation of a hash of the first entry and a hash of the second entry.

In some implementations, server 310 may discard private key 328 based on addition of a final entry to secure data structure 332. To illustrate, upon completion of all of development stages 340 (e.g., an entirety of the development process) and storage of digital signatures 330 as entries in secure data structure 332, server 310 (e.g., processor 312) may discard private key 328. Discarding private key 328 may include deleting private key 328 from memory 314 or altering or otherwise marking private key 328 as unusable. Discarding private key 328 after completion of storing entries in secure data structure 332 may prevent any other device from being capable of altering entries within, or adding entries to, secure data structure 332, which may transition secure data structure 332 from being "append only" to "read only." For example, prior to deletion of private key 328, entries may be appended to secure data structure 332 by server 310 using private key 328, and after deletion, secure data structure 332 is no longer modifiable and can only be read.

After completing development stages 340, generating digital signatures 330, and adding entries to secure data structure 332, server 310 may generate a software release 350. Software release 350 may include software 316 (e.g., one or more files) and software release information that includes validation information 352. Validation information includes data components 317, and optionally public key 326 and secure data structure 332. Server 310 transmits software release 350 to node device 360 based on node device 360 being indicated in node information associated with software 316 (e.g., a list of node devices to which software 316 is to be distributed). Server 310 also transmits software release 350 to other node devices indicated by the node information. Although described as transmitting software release 350 to node device 360, in some other implementations, server 310 may provide a portion, or an entirety, of software release 350 to node device 360 in other manners. For example, server 310 may store secure data structure 332 in a public database that is accessible to node device 360 (and any other device indicated by the node information), and public key 326 may be distributed with validation information 352 or in separate messaging. Additionally or alternatively, instead of being transmitted to node device 360, validation information 352 may be stored in the database that stores secure data structure 332, and node device 360 may retrieve validation information 352 from the database.

In some implementations, prior to transmission of software release 350, server 310 encrypts secure data structure 332 based on storage key 338. Storage key 338 may be accessible to other devices, such as node device 360. In some implementations, storage key 338 includes or corresponds to master key 324. In some other implementations, storage key 338 is a different encryption key that is transmitted along with software release 350 to node device 360, or is otherwise accessible to node device 360. In some implementations, although secure data structure 332 is encrypted, public key 326 and stage data 319 are not encrypted. In some other implementations, all of validation information 352 (e.g., secure data structure 332, public key 326, and stage data 319) are encrypted based on storage key 338 prior to transmission to node device 360.

After receiving software release 350 from server 310, node device 360 identifies the one or more files indicated by the software release information. In some implementations, node device 360 receives software 316 from server 310 and stores software 316 in transaction directory 370. Alternatively, node device 360 may retrieve software 316 and validation information 352 from a public database or other storage location. In some implementations, node device 360 may already store at least one of the one or more files, and the one or more files may be transferred to transaction directory 370 as software 316.

After identifying (and/or receiving) software 316, node device 360 may perform one or more validation operations on software 316 and/or on validation information 352. For example, validator 363 verifies whether software 316 has completed at least a portion of the development process that includes development stages 340 based on validation information 352. To illustrate, node device 360 may validate the digital signatures stored in secure data structure 332 to determine whether software 316 successfully completed at least a portion of the development process. Additionally, or alternatively, node device 360 may validate the digital signatures stored in secure data structure 332 to determine whether data components 317 are accurate and/or whether software 316 or data components 317 have been altered after completion of the portion of the development process. Node device 360 (e.g., validator 363) may validate the digital signatures stored in secure data structure 332 by generating validation signatures 366 based on data components 317 and public key 326, and comparing each validation signature to the corresponding digital signature.

To illustrate, validator 363 may generate validation signatures 366 by signing each piece of stage data 319 using public key 326, similar to how server 310 generates digital signatures 330 using private key 328. In some implementations, validation signatures 366 include at least a first validation signature 367 and a second validation signature 368. For example, validator 363 may generate first validation signature 367 based on head data 318 and public key 326. As another example, validator 363 may generate second validation signature 368 based on first stage data 320 (e.g., associated with first development stage 342) and public key 326. Thus, each validation signature of validation signatures 366 may be generated based on a corresponding data component and public key 326. In some implementations, validator 363 may generate one or more validation signatures 366 based on an entirety (or a portion) of the corresponding data component. For example, validator 363 may stringify or otherwise package head data 318 (or a portion thereof) to generate first validation signature 367. In some other implementations, validator 363 may generate validation signatures 366 based on a hash value, or other value, based on the corresponding stage data. For example, validator 363 may generate a first hash value based on head data 318, and validator 363 may generate first validation signature 367 based on the first hash value and public key 326.

After generating validation signatures 366, node device 360 (e.g., validator 363) compares validation signatures 366 to the digital signatures stored in secure data structure 332 to validate data components 317 and/or software 316. To illustrate, validator 363 may compare a validation signature associated with a particular data component to a digital signature stored in secure data structure 332 that is associated with the particular data component to perform the validation. For example, validator 363 may compare first validation signature 367 to first digital signature 334 stored in secure data structure 332. As another example, validator 363 may compare second validation signature 368 to second digital signature 336 stored in secure data structure 332. Because validation signatures 366 are generated in the same manner as digital signatures 330, if a validation signature matches a corresponding digital signature, node device 360 may verify that software 316 completed the associated development stage (or portion or entirety of the development process) and validate the associated data component (e.g., verify that the associated data component is accurate). For example, validator 363 may validate first digital signature 334 and head data 318 based on first validation signature 367 matching first digital signature 334. Validating first digital signature 334 and/or head data 318 verifies that software 316 successfully completed initiation of the development process. As another example, validator 363 may validate second digital signature 336 and first stage data 320 based on second validation signature 368 matching second digital signature 336. Validating second digital signature 336 and/or first stage data 320 verifies that software 316 successfully completed first development stage 342. It will be noted that, although public key 326 enables generation of one or more validation signatures, public key 326 cannot be used to add or modify entries in secure data structure 332. Thus, in at least some implementations, data components 317 and public key 326 may be transmitted without encryption, because if a malicious actor alters data components 317 or public key 326, validation will fail at recipient devices (e.g., node device 360).

In some implementations, at least a portion of validation information 352 is encrypted by server 310. In such implementations, node device 360 (e.g., validator 363) may decrypt the encrypted portion of validation information 352 based on storage key 338. For example, if secure data structure 332 is encrypted when received (or retrieved from a public database), validator 363 may decrypt secure data structure 332 based on storage key 338. In some implementations, node device 360 may receive storage key 338 from server 310, such as in addition to or as part of software release 350. In some other implementations, server 310 and node device 360 may each generate copies of the same storage key (e.g., storage key 338) based on instructions or other shared information.

Node device 360 processes software 316 based on verifying that software 316 (e.g., the one or more files) has completed development stages 340 and that data components 317 are accurate. For example, if validator 363 performs successful validation, node device 360 may load software 316 to memory 364 (or another memory other than transaction directory 370). Additionally, node device 360 may set validation flag 369 to indicate that software 316 has successfully completed development stages 340 (e.g., the development process) and that data components 317 are accurate. Processing software 316 may also include executing software 316 at node device 360. In some implementations, software 316 may be executed based on at least a portion of data components 317, such as head data 318, stage data 319, completed development information 323, or a combination thereof. Node device 360 may also transmit a notification to server 310, the notification indicating that software 316 is accepted. Alternatively, if validator 363 fails validation, node device 360 may discard (e.g., delete) software 316 from transaction directory 370 and transmit a notification to server 310, the notification indicating that software 316 is rejected. Additionally, node device 360 may clear validation flag 369. In some implementations, the notification may identify which digital signature is not validated, which development stage or data component corresponds to the non-validated digital signature, an author that corresponds to the non-validated digital signature, or a combination thereof.

In some implementations, node device 360 may display a user interface (UI) that displays information associated with the development process. For example, the UI may include a button or other selectable indicator to enable validation of the development process, and validation information 352 may be shared, and secure data structure 332 updated, based on input to the UI. As validation may be time consuming and resource intensive, providing an option to validate the development process may reduce demand on server 310 when validation is not requested. When validation is requested, data components 317 or completed development information 323 may be displayed in addition to a "last validated time." Additionally or alternatively, any of stage data 319 may be displayed (e.g., based on a particular request or as part of the display at the UI based on the request for validation). Although described as being performed by node device 360, in some implementations, display of the UI for validation purposes may be performed at server 310.

According to one aspect, a system for sharing validation information of a software release associated with multiple development stages is described. The system includes at least one memory (e.g., 314) storing instructions and one or more processors (e.g., 312) coupled to the at least one memory. The one or more processors are configured to execute the instructions to cause the one or more processors to obtain one or more files (e.g., 316) associated with the software release (e.g., 350) based on performance of at least a portion of a development process that includes the multiple development stages (e.g., 340). Performance of at least a portion of the development process generates data components (e.g., 317) associated with general development parameters, one or more development stages of the multiple development stages, or a combination thereof. The one or more processors are also configured to generate a private key (e.g., 328) and a public key (e.g., 326) based on a master key (e.g., 324) accessible to the one or more processors. The one or more processors are configured to, for each of the data components, generate a digital signature (e.g., 330) based at least in part on the respective data component and the private key, and add an entry that includes the digital signature to a secure data structure (e.g., 332) accessible to one or more node devices (e.g., 360). The entry is added based on a previous entry in the secure data structure. The one or more processors are further configured to initiate transmission of the data components, the public key, and the one or more files to the one or more node devices.

According to another aspect, a computer program product is described that includes a computer-readable storage device, such as a non-transitory computer-readable storage medium, that includes instructions that, when executed by one or more processors (e.g., 312), cause the one or more processors to perform operations for sharing validation information of a software release associated with multiple development stages. The operations include executing a first routine to obtain one or more files (e.g., 316) associated with the software release (e.g., 350) based on performance of at least a portion of a development process that includes the multiple development stages (e.g., 340). Performance of at least the portion of the development process generates data components (e.g., 317) associated with general development parameters, one or more development stages of the multiple development stages, or a combination thereof. The operations also include executing a second routine to generate a private key (e.g., 328) and a public key (e.g., 326) based on a master key (e.g., 324) accessible to the one or more processors. The operations include executing a third routine to, for each of the data components, generate a digital signature (e.g., 330) based at least in part on the respective data component and the private key, and add an entry that includes the digital signature to a secure data structure (e.g., 332) accessible to one or more node devices (e.g., 360). The entry is added based on a previous entry in the secure data structure. The operations further include executing a fourth routine to initiate transmission of the data components, the public key, and the one or more files to the one or more node devices.

According to another aspect, a system for validation of a deployed software release associated with multiple development stages is described. The system includes at least one memory (e.g., 364) storing instructions and one or more processors (e.g., 362) coupled to the at least one memory. The one or more processors are configured to execute the instructions to cause the one or more processors to receive one or more files (e.g., 316) of the deployed software release (e.g., 350) and validation information (e.g., 352) including data components (e.g., 317) associated with a development process that includes the multiple development stages (e.g., 340). The one or more processors are also configured to access a secure data structure (e.g., 332) and a public key (e.g., 326) associated with the development process. The secure data structure includes one or more digital signatures (e.g., 330) associated with the data components. The public key is associated with a private key (e.g., 328) used to generate the one or more digital signatures. The one or more processors are also configured to, for each of the one or more digital signatures included in the secure data structure to validate the one or more digital signatures, generate a validation signature (e.g., 366) based at least in part on the data component corresponding to the digital signature and the public key, and compare the validation signature to the digital signature in the secure data structure. The one or more processors are further configured to process the one or more files based on validation of the one or more digital signatures.

According to another aspect, a computer program product is described that includes a computer-readable storage device, such as a non-transitory computer-readable storage medium, that includes instructions that, when executed by one or more processors (e.g., 362), cause the one or more processors to perform operations for validation of a deployed software release associated with multiple development stages. The operations include executing a first routine to receive one or more files (e.g., 316) of the deployed software release (e.g., 350) and validation information (e.g., 352) including data components (e.g., 317) associated with a development process that includes the multiple development stages (e.g., 340). The operations also include executing a second routine to access a secure data structure (e.g., 332) and a public key (e.g., 326) associated with the development process. The secure data structure includes one or more digital signatures (e.g., 330) associated with the data components. The public key is associated with a private key (e.g., 328) used to generate the one or more digital signatures. The operations also include executing a third routine to, for each of the one or more digital signatures included in the secure data structure to validate the one or more digital signatures, generate a validation signature (e.g., 366) based at least in part on the data component corresponding to the digital signature and the public key, and compare the validation signature to the digital signature in the secure data structure. The operations further include executing a fourth routine to process the one or more files based on validation of the one or more digital signatures.

Thus, system 300 describes generation and/or use of a secure data structure that stores digital signatures to verify whether software 316 has completed at least a portion of a development process, such as at least one of development stages 340, and validate whether data components 317 are accurate. For example, secure data structure 332 (storing one or more digital signatures), data components 317, and public key 326 may be included in software release 350 that is transmitted to node device 360 (or retrieved from a database accessible to node device 360). Data components 317 and public key 326 may advantageously be used by node device 360 to validate the digital signatures stored in secure data structure 332, which verifies whether software 316 has successfully completed at least a portion of the development process and validates that data components 317 are accurate. Thus, node device 360 may refrain from processing software that has not completed at least a portion of the development process and/or using inaccurate (or altered) data components 317, which may prevent node device 360 from being exposed to vulnerabilities corresponding to software that is not fully developed and tested (e.g., has not successfully completed the development stages 340). This may also prevent insertion of unauthorized code into software 316 after completion of the development process (or a development stage thereof).

Referring to FIG. 4, a block diagram of a system for sharing validation information of a software release according to one or more aspects is shown and designated 400. System 400 may include or correspond to at least a portion of system 100 and/or system 200. System 400 includes an entity device 410, a server 440, and a node device 470.

Entity device 410, server 440 and node device 470 may be coupled via one or more networks, such as network 120. Entity device 410 may include or correspond to entity server 140, entity 150, 150a, 150b, or any combination thereof. Server 440 may include or correspond to server 110, server 168, or a combination thereof. Node device 470 may include or correspond to node device 160, 160a, 160b, 160c, or 160d.

Entity device 410 includes one or more processors 412 and a memory 414. Memory 414 includes software 416 (e.g., one or more files) and data components 417. Data components 417 may include head data 418, stage data 419, completed development information 422, other data, or a combination thereof. Head data 418 may include general development parameters associated with the development process (e.g., the pipeline run), such as configuration data at the time of initiation, a development process version number, an initiation time (e.g., a timestamp), an identifier (e.g., name) associated with the development process, a run number associated with the development process, details of a git command associated with the development process, or a combination thereof. In some implementations, the config data may include full pipeline yaml configuration data output as a string. Stage data 419 includes data generated during performance of one or more development stages of a development process for a software release, such as configuration data associated with the development stage, one or more inputs to the development stage, one or more outputs from the development stage, a start time for the development stage, an end time for the development stage, one or more authors associated with the development stage, one or more trigger conditions associated with the development stage, or any combination thereof. In some implementations, stage data 419 includes first stage data 420 and second stage data 421. In some other implementations, more than two stage data may be included in stage data 419. Completed development information 422 may include a completion time and references to each of the other data components/run components, such as an ordered list of hashes of head data 418 and stage data 419. Additionally, memory 414 may include instructions (not shown) that are executable by processor 412 to cause processor 412 to perform one or more operations. In some implementations, the instructions may include or be arranged as an application, such as application 284 (e.g., a software program) of FIG. 2, associated with server 440.

Entity device 410 also includes or performs a development process that includes multiple development stages 424. The development stages are of a development process for software and include development stages such as building, unit tests, integration tests, and assembly, as non-limiting examples. In some implementations, development stages 424 include a first development stage 426 and a second development stage 428. In some other implementations, more than two development stages may be included in development stages 424. In some implementations, development stages 424 correspond to a CI/CD pipeline for building and deploying a software release. Performance of the development stages 424 may cause generation of stage data 419. For example, performance of first development stage 426 may cause generation of first stage data 420, and performance of second development stage 428 may cause generation of second stage data 421. Additionally or alternatively, initiation of the development process may cause generation of head data 418, and completion of the development process may cause generation of completed development information 422. Although system 400 is described as including one entity device 410, in some other implementations, system 400 may include multiple entity devices (e.g., 410) coupled to server 440.

Server 440 includes one or more processors 442 and a memory 444. Memory 444 may include or correspond to memory 210 of FIG. 2. Memory 444 includes software 446 (e.g., one or more files/artifacts), a master key 448, a public key 450, a private key 452, digital signatures 454, a secure data structure 456, and optionally a storage key 459. Software 446 may include or correspond to software 116 and may include one or more of artifacts 114 and/or artifacts 218. Master key 448 may include or correspond to a cryptographic key associated with a universal artifact repository or software release deployment supported by server 440. Public key 450 and private key 452 include or correspond to keys generated by server 440 (e.g., processor 442) based on master key 448, and may be part of a public/private key pair. Digital signatures 454 may include digital signatures generated based on data components 417 and private key 452, as further described herein. Secure data structure 456 includes or corresponds to a secure data structure that is immutable to other devices and is configured for serial addition of entries. To illustrate, each subsequent entry of secure data structure 456 may be based at least in part on a previous entry of secure data structure 456. In some implementations, secure data structure 456 includes or corresponds to a private blockchain. Additionally or alternatively, secure data structure 456 may include or be implemented as a tree structure, such as an MMR tree as a non-limiting example. Secure data structure 456 may be configured to store digital signatures 454 for transmission to other devices, such as node device 470. In some implementations, secure data structure 456 stores a first digital signature 457 and a second digital signature 458. In some other implementations, secure data structure 456 stores more than two digital signatures. Storage key 459 includes or corresponds to a cryptographic key used by server 440 to encrypt data for transmission to other devices. In some implementations, storage key 459 includes master key 448. In some other implementations, storage key 459 is distinct from master key 448, such as based on master key 448 or otherwise generated or received by server 440. Additionally, memory 444 may include instructions (not shown) that are executable by processor 442 to cause processor 442 to perform one or more operations. In some implementations, the instructions may include or be arranged as an application, such as application 214 (e.g., a software program) of FIG. 2.

Although system 400 is described as including one server 440, in other implementations, system 400 may include multiple servers (e.g., 440) coupled to entity device 410 and/or node device 470. Additionally, or alternatively, it is noted that server 440 (e.g., processor 442) may include one or more additional components or modules, such as manager 252, deployer 253, replicator 254, tracker 256, analyzer 258, and/or indexer 260, as illustrative, non-limiting examples.

Node device 470 includes one or more processors 472, a memory 474 (e.g., one or more memories), and a transaction directory 480. Transaction directory 480 may include or correspond to a storage device configured to receive and store one or more files. In some implementations, transaction directory 480 is distinct from memory 474. In other implementations, transaction directory 480 includes a logical or virtual portion of memory 474.

Memory 474 may include instructions (not shown) that are executable by processor 472 to cause processor 472 to perform one or more operations. In some implementations, the instructions may include or be arranged as an application, such as application 294 (e.g., a software program) of FIG. 2. Additionally, or alternatively, memory 474 may include one or more files (e.g., software), such as software corresponding to a release bundle.

Processor 472 includes a validator 473. Validator 473 is configured to verify whether software (e.g., one or more files) has successfully completed at least a portion of the development processes, such as one or more of the multiple development stages of development stages 424. For example, validator 473 may verify that one or more files have successfully completed an initial development stage, an intermediate development stage, a final development stage, or multiple development stages. Additionally, or alternatively, validator 473 may validate that received data components are accurate, and that the one or more files and the data components have not been altered after completion of the development stages 424 (or an entirety of the development process). In some implementations, validator 473 includes a validator module that includes one or more routines, executable by one or more processors (e.g., the processor 172 of FIG. 1 or processor 472) to verify whether software has successfully completed at least a portion of the development process and validate whether the received data components are accurate.

Although system 400 is described as including one node device 470, in other implementations, system 400 may include multiple node devices (e.g., 470) coupled to server 440. Additionally, or alternatively, it is noted that node device 470 (e.g., processor 472) may include one or more additional components or modules, such as manager 252 and/or replicator 254, as illustrative, non-limiting examples.

During operation of system 400, entity device 410 performs at least a portion of a development process that includes development stages 424 on software 416 (e.g., one or more files). Successful completion of a corresponding portion of the development process causes a corresponding data component of data components 417 to be generated. For example, successful initiation of the development process causes generation of head data 418. As another example, successful completion of first development stage 426 causes generation of first stage data 420. Stage data corresponding to a particular development stage includes inputs to the particular development stage (e.g., outputs of a previous development stage), configuration ("config") data associated with or generated during the particular development stage (e.g., action flags, locations in a file system of actions or files to be acted on, registry names, document image names, and the like), outputs of the particular development stage (e.g., inputs to a subsequent development stage), information associated with the particular development stage (e.g., author(s) or trigger condition(s), start time, end time, build job number, and the like), additional data, or a combination thereof. For example, first stage data 420 may include configuration data associated with first development stage 426, one or more inputs to first development stage 426, one or more outputs from first development stage 426, a start time for first development stage 426, an end time for first development stage 426, one or more authors associated with first development stage 426, one or more trigger conditions of first development stage 426, a build job number associated with performance of first development stage 426, other information associated with first development stage 426, or any combination thereof. In some implementations, first development stage 426 corresponds to a unit test, and second development stage 428 corresponds to an integration test. In other implementations, first development stage 426 and second development stage 428 correspond to other development stages.

Upon completion of development stages 424 (e.g., an entirety of the development process) to generate software 416 and data components 417, entity device 410 may transmit software 416 and data components 417 to server 440. In some implementations, server 440 receives software 416 and data components 417 from entity device 410 and stores software 416 at memory 444 as software 446 (e.g., one or more files or artifacts). Alternatively, server 440 may receive an indication of the files included in software 416, such as a list of the files, a checksum for each of the files, a checksum for an entirety of the files, or a combination thereof, and server 440 may identify files 446 (e.g., artifacts) stored at memory 444 that correspond to software 416.

In some implementations, entity device 410 also generates and/or provides node information 430. Node information 430 includes an indication of one or more node devices, such as node device 470, that software 416 is to be released to. In some implementations, node information 430 may indicate one or more distribution paths that are to be used to distribute software 416 to the one or more node devices. Server 440 receives node information 430 from entity device 410 and uses node information 430 to determine which node devices to send a software release to.

After receiving software 416, data components 417, and optionally node information 430, server 440 generates public key 450 and private key 452 to use in generating digital signatures. Public key 450 and private key 452 may be included in a public/private key pair that is generated by server 440. For example, server 440 may generate the public/private key pair based on master key 448. In some implementations, public key 450, private key 452, or both may include or correspond to GPG keys. To further illustrate, private key 452 (and corresponding public key 450) may be a "run key" that is generated using master key 448 as a certificate (e.g., to sign private key 452 and public key 450). In some implementations, master key 448 includes or corresponds to a private and secure key that is maintained by server 440 and stored at memory 444 as part of supporting a universal artifact repository at server 440. Server 440 may generate and store public key 450 and private key 452 at memory 444 for use in generating digital signatures and for transmission to other devices.

Server 440 generates digital signatures 454 to indicate successful completion of development stages 424 (or a portion thereof). To illustrate, server 440 may generate a corresponding digital signature of digital signatures 454 using the corresponding data component of data component 417 and private key 452. For example, server 440 may generate first digital signature 457 based at least in part on head data 418 and private key 452. As another example, server 440 may generate second digital signature 458 based at least in part on first stage data 420 and private key 452. As another example, server 440 may generate a final digital signature based at least in part on completed development information 422 and private key 452. As yet another example, a digital signature may be generated for completion of an initial development stage, a digital signature may be generated for completion of an intermediate development stage, and a digital signature may be generated for completion of a final development stage. Server 440 may generate digital signatures 454 when software 416 is received, when data components 417 are received, or at another time. For example, entity device 410 may provide corresponding data component(s) upon completion of a particular development stage of development stages 424, and server 440 may generate a digital signature for the particular data component based on receiving the corresponding data component (e.g., based upon successful completion of the particular development stage that caused generation of the data component).

In some implementations, at least one development stage can have two or more digital signatures (e.g., there may be different digital signatures for when different sets of files complete the same development stage). In some implementations, each digital signature may correspond to a software build job, such as a software build job of a CI/CD pipeline. For example, each digital signature of digital signatures 454 may represent successful completion by a software build job of a corresponding development stage or portion of the development process (e.g., receipt of a corresponding data component by server 440, which indicates successful completion of the corresponding portion of the development process). Each digital signature of digital signatures 454 may correspond to a respective one or more files (e.g., artifacts) or to an entirety of software 446 (e.g., one or more files). Additionally, or alternatively, regardless of the process used to generate digital signatures 454, each of digital signature of digital signatures 454 may be reproducible at another device, such as node device 470, using the corresponding data component and a key, such as public key 450, as further described herein.

In some implementations, server 440 generates digital signatures 454 using the corresponding data components (e.g., either an entirety or portion thereof). To illustrate, server 440 may stringify or otherwise package the corresponding data component, such as by serially ordering the corresponding data component and converting the ordered data component to a string, and server 440 may sign (e.g., encrypt) the string (or otherwise packaged) version of the corresponding data component using private key 452 to generate a corresponding digital signature. For example, server 440 may generate first digital signature 457 by signing a string (or other data type) corresponding to an entirety (or a portion) of head data 418 using private key 452. As another example, server 440 may generate second digital signature 458 by signing a string (or other data type) corresponding to an entirety (or a portion) of first stage data 420 using private key 452. In some implementations, server 440 generates a digital signature for each development stage of development stages 424 based on stage data corresponding to the respective development stage and private key 452, in addition to digital signatures based on head data 418 and completed development information 422.

In some other implementations, server 440 generates digital signatures 454 using a value that is based on the corresponding data component (e.g., either an entirety or portion thereof). To illustrate, server 440 may generate a hash value (or other value) based on the corresponding data component, and server 440 may sign (e.g., encrypt) the hash value (or other value) using private key 452 to generate a corresponding digital signature. For example, server 440 may generate a first hash value based on an entirety (or a portion) of head data 418, and server 440 may generate first digital signature 457 by signing the first hash value using private key 452. As another example, server 440 may generate a second hash value based on an entirety (or portion) of first stage data 420, and server 440 may generate second digital signature 458 by signing the second hash value using private key 452. Any type of hash function or other one-way mapping function may be used, such as a MD5 function, a SHA-1 function, a SHA-2 function, a RIPEMD function, an AES function, a SHA-3 function, a BLAKE2 function, or a BLAKE3 function, as non-limiting examples. In some implementations, server 440 generates a digital signature for each data component of data components 417 based on a hash value (or other value) based on the respective data component and private key 452. Generating digital signatures 454 based on hash values (or other values) that are based on data components 417 may reduce the memory footprint associated with digital signatures 454.

After generating digital signatures 454, server 440 may store one or more digital signatures of digital signatures 454 in secure data structure 456. Secure data structure 456 may be configured to store one or more digital signatures and to be immutable to other devices. For example, entries, such as digital signatures, in secure data structure 456 are not retroactively alterable without subsequent alteration of all subsequent entries, which may require private key 452 (which is not accessible to other devices). In some implementations, secure data structure 456 may include or correspond to a private blockchain that is maintained by server 440 (e.g., a blockchain that is not distributed amongst multiple devices). Additionally, or alternatively, secure data structure 456 may be configured for serial addition of entries. To illustrate, each subsequent entry of secure data structure 456 may be based at least in part on the previous entry within secure data structure 456. For example, a subsequent entry in secure data structure 456 may include a cryptographic hash, or other information, that is based on a previous entry in secure data structure 456 and that links the subsequent entry to the previous entry. In some implementations, secure data structure 456 may include or correspond to a tree structure. For example, secure data structure 456 may be maintained as a tree, such as a binary using last odd leaf duplication (for trees with an odd number of leaves) or a MMR tree, as non-limiting examples.

Server 440 may be configured to store digital signatures 454 in respective entries of secure data structure 456. For example, server 440 may add a first entry that includes first digital signature 457 to secure data structure 456. As another example, server 440 may add a second entry that includes second digital signature 458 and that is based at least in part on the first entry to secure data structure 456. To further illustrate, the second entry (that includes second digital signature 458) may include a cryptographic hash value, or other value, that is based on the first entry (that includes first digital signature 457). In some implementations, each entry in secure data structure 456 may include a digital signature for a respective development stage and at least a portion of the stage data associated with the respective development stage. For example, the first entry of secure data structure 456 may include first digital signature 457 and at least a portion of head data 418. As another example, the second entry of secure data structure 456 may include second digital signature 458, a hash value based on the first entry, and at least a portion of first stage data 420.

In some implementations, server 440 may discard private key 452 based on addition of a final entry to secure data structure 456. To illustrate, upon storage of digital signatures 454 as entries in secure data structure 456, server 440 (e.g., processor 442) may discard private key 452. Discarding private key 452 may include deleting private key 452 from memory 444 or altering or otherwise marking private key 452 as unusable. Discarding private key 452 after completion of storing entries in secure data structure 456 may prevent any other device from being capable of altering entries within, or adding entries to, secure data structure 456, which may transition secure data structure 456 from append-only to read-only.

After generating digital signatures 454 and adding entries to secure data structure 456, server 440 may generate a software release 460. Software release 460 may include software 446 (e.g., one or more files) and software release information that includes validation information 462. Validation information 462 includes data components 417, and optionally public key 450, and secure data structure 456. Server 440 transmits software release 460 to node device 470 based on node device 470 being indicated in node information 430. Server 440 also transmits software release 460 to other node devices indicated by node information 430. Although described as transmitting software release 460 to node device 470, in some other implementations, server 440 may provide a portion, or an entirety, of software release 460 to node device 470 in other manners. For example, server 440 may store secure data structure 456, data components 417, or both in a public database that is accessible to node device 470 (and any other device indicated by node information 430). Additionally or alternatively, public key 450 may be provided to node device 470 via separate signaling, or with validation information 462.

In some implementations, prior to transmission of software release 460, server 440 encrypts secure data structure 456 based on storage key 459. Storage key 459 may be accessible to other devices, such as node device 470. In some implementations, storage key 459 includes or corresponds to master key 448. In some other implementations, storage key 459 is a different encryption key that is transmitted along with software release 460 to node device 470, or is otherwise accessible to node device 470. In some implementations, although secure data structure 456 is encrypted, public key 450 and data components 417 are not encrypted. In some other implementations, all of validation information 462 (e.g., secure data structure 456, public key 450, and data components 417) is encrypted based on storage key 459 prior to transmission to node device 470.

Although server 440 is described as generating digital signatures 454 and managing secure data structure 456 and keys (e.g., public key 450, private key 452, etc.), in some other implementations, entity device 410 may generate digital signatures 454 and/or manage secure data structure 456 and the keys. For example, entity device 410 may access master key 448 to generate public key 450 and private key 452, and entity device 410 may generate digital signatures 454 based on data components 417 and private key 452. In some such implementations, entity device 410 may transmit data components 417, digital signatures 454, and public key 450 to server 440 for maintenance of secure data structure 456 and transmission of software release 460 to node device 470. In some other implementations, entity device 410 may maintain secure data structure 456, such as storing entries in secure data structure 456 using private key 452. In such implementations, entity device may transmit data components 417, secure data structure 456, and public key 450 to server 440 for use in transmission of software release 460, or entity device 410 may transmit data components 417, secure data structure 456, and public key 450 directly to node device 470 (and any other node device indicated in node information 430).

After receiving software release 460 from server 440 (or entity device 410), node device 470 identifies the one or more files indicated by the software release information. In some implementations, node device 470 receives software 446 from server 440 and stores software 446 in transaction directory 480. Alternatively, node device 470 may retrieve software 446 and validation information 462 from a public database or other storage location. In some implementations, node device 470 may already store at least one of the one or more files, and the one or more files may be transferred to transaction directory 480 as software 446.

After identifying (and/or receiving) software 446, node device 470 may perform one or more validation operations on software 446 and/or on validation information 462. For example, validator 473 verifies whether software 446 has completed the development process (e.g., development stages 424) based on validation information 462. To illustrate, node device 470 may validate the digital signatures stored in secure data structure 456 to determine whether software 446 successfully completed the corresponding portion of the development process. Additionally, or alternatively, node device 470 may validate the digital signatures stored in secure data structure 456 to determine whether data components 417 are accurate and/or whether software 446 or data components 417 have been altered after completion of development stages 424. Node device 470 (e.g., validator 473) may validate the digital signatures stored in secure data structure 456 by generating validation signatures 476 based on data components 417 and public key 450, and comparing each validation signature to the corresponding digital signature.

To illustrate, validator 473 may generate validation signatures 476 by signing each of data components 417 using public key 450, similar to how server 440 generates digital signatures 454 using private key 452. In some implementations, validation signatures 476 include at least a first validation signature 477 and a second validation signature 478. For example, validator 473 may generate first validation signature 477 based on head data 418 and public key 450. As another example, validator 473 may generate second validation signature 478 based on first stage data 420 (e.g., associated with first development stage 426) and public key 450. Thus, each validation signature of validation signatures 476 may be generated based on a corresponding data component and public key 450. In some implementations, validator 473 may generate one or more validation signatures 476 based on an entirety (or a portion) of the corresponding data component. For example, validator 473 may stringify or otherwise package head data 418 (or a portion thereof) to generate first validation signature 477. In some other implementations, validator 473 may generate validation signatures 476 based on a hash value, or other value, based on the corresponding data component. For example, validator 473 may generate a first hash value based on head data 418, and validator 473 may generate first validation signature 477 based on the first hash value and public key 450.

After generating validation signatures 476, node device 470 (e.g., validator 473) compares validation signatures 476 to the digital signatures stored in secure data structure 456 to validate data components 417 and/or software 446. To illustrate, validator 473 may compare a validation signature associated with a particular data component to a digital signature stored in secure data structure 456 that is associated with the particular data component to perform the validation. For example, validator 473 may compare first validation signature 477 to first digital signature 457 stored in secure data structure 456. As another example, validator 473 may compare second validation signature 478 to second digital signature 458 stored in secure data structure 456. Because validation signatures 476 are generated in the same manner as digital signatures 454, if a validation signature matches a corresponding digital signature, node device 470 may verify that software 446 completed the associated development stage or portion of the development process and validate the associated data component (e.g., verify that the associated data component is accurate). For example, validator 473 may validate first digital signature 457 and head data 418 based on first validation signature 477 matching first digital signature 457. Validating first digital signature 457 and/or head data 418 verifies that software 446 successfully completed initialization of the development process. As another example, validator 473 may validate second digital signature 458 and first stage data 420 based on second validation signature 478 matching second digital signature 458. Validating second digital signature 458 and/or first stage data 420 verifies that software 446 successfully completed first development stage 426. It will be noted that, although public key 450 enables generation of one or more validation signatures, public key 450 cannot be used to add or modify entries in secure data structure 456. Thus, in at least some implementations, data components 417 and public key 450 may be transmitted without encryption, because if a malicious actor alters data components 417 or public key 450, validation will fail at recipient devices (e.g., node device 470).

In some implementations, at least a portion of validation information 462 is encrypted by server 440. In such implementations, node device 470 (e.g., validator 473) may decrypt the encrypted portion of validation information 462 based on storage key 459. For example, if secure data structure 456 is encrypted when received (or retrieved from a public database), validator 473 may decrypt secure data structure 456 based on storage key 459. In some implementations, node device 470 may receive storage key 459 from server 440, such as in addition to or as part of software release 460. In some other implementations, server 440 and node device 470 may each generate copies of the same storage key (e.g., storage key 459) based on instructions or other shared information.

Node device 470 processes software 446 based on verifying that software 446 (e.g., the one or more files) has completed the development process (e.g., development stages 424) and that data components 417 are accurate. For example, if validator 473 performs successful validation, node device 470 may load software 446 to memory 474 (or another memory other than transaction directory 480). Additionally, node device 470 may set validation flag 479 to indicate that software 446 has successfully completed development stages 424 and that data components 417 are accurate. Processing software 446 may also include executing software 446 at node device 470. In some implementations, software 446 may be executed based on at least a portion of data components 417. Node device 470 may also transmit a notification to server 440, the notification indicating that software 446 is accepted. Alternatively, if validator 473 fails validation, node device 470 may discard (e.g., delete) software 446 from transaction directory 480 and transmit a notification to server 440, the notification indicating that software 446 is rejected. Additionally, node device 470 may clear validation flag 479. In some implementations, the notification may identify which digital signature is not validated, which development stage corresponds to the non-validated digital signature, an author that corresponds to the non-validated digital signature, or a combination thereof. The notification may be sent from server 440 to entity device 410.

In some implementations, node device 470 may display a UI that displays information associated with the development process. For example, the UI may include a button or other selectable indicator to enable validation of the development process, and validation information 462 may be shared, and secure data structure 456 updated, based on input to the UI. As validation may be time consuming and resource intensive, providing an option to validate the development process may reduce demand on server 440 when validation is not requested. When validation is requested, data components 417 or completed development information 422 may be displayed in addition to a "last validated time." Additionally or alternatively, any of stage data 419 may be displayed (e.g., based on a particular request or as part of the display at the UI based on the request for validation). Although described as being performed by node device 470, in some implementations, display of the UI for validation purposes may be performed at server 440.

According to one aspect, a system for sharing validation information of a software release associated with multiple development stages is described. The system includes at least one memory (e.g., 444) storing instructions and one or more processors (e.g., 442) coupled to the at least one memory. The one or more processors are configured to execute the instructions to cause the one or more processors to obtain one or more files (e.g., 446) associated with the software release (e.g., 460) based on performance of at least a portion of a development process that includes the multiple development stages (e.g., 424). Performance of at least the portion of the development process generates data components (e.g., 417) associated with general development parameters, one or more development stages of the multiple development stages, or a combination thereof. The one or more processors are also configured to generate a private key (e.g., 452) and a public key (e.g., 450) based on a master key (e.g., 448) accessible to the one or more processors. The one or more processors are configured to, for each of the data components, generate a digital signature (e.g., 454) based at least in part on the respective data component and the private key, and add an entry that includes the digital signature to a secure data structure (e.g., 456) accessible to one or more node devices (e.g., 470). The entry is added based on a previous entry in the secure data structure. The one or more processors are further configured to initiate transmission of the data components, the public key, and the one or more files to the one or more node devices.

According to another aspect, a computer program product is described that includes a computer-readable storage device, such as a non-transitory computer-readable storage medium, that includes instructions that, when executed by one or more processors (e.g., 442), cause the one or more processors to perform operations for sharing validation information of a software release associated with multiple development stages. The operations include executing a first routine to obtain one or more files (e.g., 446) associated with the software release (e.g., 460) based on performance of at least a portion of a development process that includes the multiple development stages (e.g., 424). Performance of at least the portion of the development process generates data components (e.g., 417) associated with general development parameters, one or more development stages of the multiple development stages, or a combination thereof. The operations also include executing a second routine to generate a private key (e.g., 452) and a public key (e.g., 450) based on a master key (e.g., 448) accessible to the one or more processors. The operations include executing a third routine to, for each of the data components, generate a digital signature (e.g., 454) based at least in part on the respective data component and the private key, and add an entry that includes the digital signature to a secure data structure (e.g., 456) accessible to one or more node devices (e.g., 470). The entry is added based on a previous entry in the secure data structure. The operations further include executing a fourth routine to initiate transmission of the data components, the public key, and the one or more files to the one or more node devices.

According to another aspect, a system for validation of a deployed software release associated with multiple development stages is described. The system includes at least one memory (e.g., 474) storing instructions and one or more processors (e.g., 472) coupled to the at least one memory. The one or more processors are configured to execute the instructions to cause the one or more processors to receive one or more files (e.g., 446) of the deployed software release (e.g., 460) and validation information (e.g., 462) including data components (e.g., 417) associated with a development process that includes the multiple development stages (e.g., 424). The one or more processors are also configured to access a secure data structure (e.g., 456) and a public key (e.g., 450) associated with the development process. The secure data structure includes one or more digital signatures (e.g., 454) associated with the data components. The public key is associated with a private key (e.g., 452) used to generate the one or more digital signatures. The one or more processors are also configured to, for each of the one or more digital signatures included in the secure data structure to validate the one or more digital signatures, generate a validation signature (e.g., 476) based at least in part on the data component corresponding to the digital signature and the public key, and compare the validation signature to the digital signature in the secure data structure. The one or more processors are further configured to process the one or more files based on validation of the one or more digital signatures.

According to another aspect, a computer program product is described that includes a computer-readable storage device, such as a non-transitory computer-readable storage medium, that includes instructions that, when executed by one or more processors (e.g., 472), cause the one or more processors to perform operations for validation of a deployed software release associated with multiple development stages. The operations include executing a first routine to receive one or more files (e.g., 446) of the deployed software release (e.g., 460) and validation information (e.g., 462) including data components (e.g., 417) associated with a development process that includes the multiple development stages (e.g., 424). The operations include executing a second routine to access a secure data structure (e.g., 456) and a public key (e.g., 450) associated with the development process. The secure data structure includes one or more digital signatures (e.g., 454) associated with the data components. The public key is associated with a private key (e.g., 452) used to generate the one or more digital signatures. The operations also include executing a third routine to, for each of the one or more digital signatures included in the secure data structure to validate the one or more digital signatures, generate a validation signature (e.g., 476) based at least in part on the data component corresponding to the digital signature and the public key, and compare the validation signature to the digital signature in the secure data structure. The operations further include executing a fourth routine to process the one or more files based on validation of the one or more digital signatures.

Thus, system 400 describes generation and/or use of secure data structure 456 that stores digital signatures to verify whether software 446 has completed at least a portion of a development process (e.g., at least one of development stages 424) and validate whether data components 417 are accurate. For example, secure data structure 456 (storing one or more digital signatures), data components 417, and public key 450 may be included in software release 460 that is transmitted to node device 470 or made otherwise accessible to node device 470. Data components 417 and public key 450 may advantageously be used by node device 470 to validate the digital signatures stored in secure data structure 456, which verifies whether software 446 has successfully completed at least a portion of the development process (e.g., one or more of development stages 424) and validates that data components 417 are accurate. Thus, node device 470 may refrain from processing software that has not completed one or more of development stages 424 and/or using inaccurate (or altered) data components 417, which may prevent node device 470 from being exposed to vulnerabilities corresponding to software that is not fully developed and tested (e.g., has not successfully completed the development stages 424). This may also prevent insertion of unauthorized code into software 446 after completion of a development stage.

Figure 5:
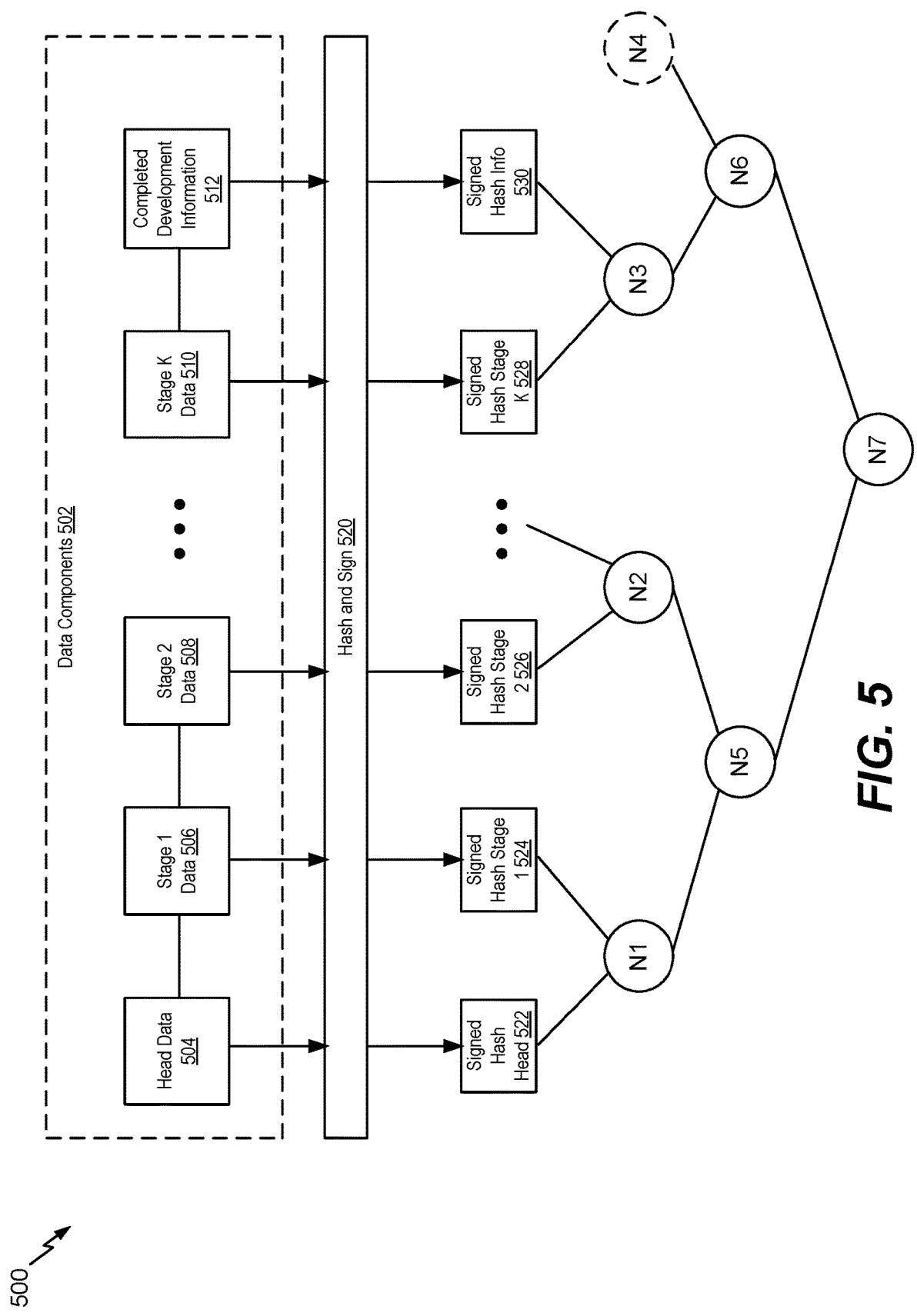
FIG. 5 is a block diagram of an example of data components and a tree structure for validating a software release.

Referring to FIG. 5, a block diagram of an example of data components and a tree structure for validating a software release according to one or more aspects is shown and designated 500. The data components may include or correspond to data components 317 of FIG. 3 or data components 417 of FIG. 4, and the tree structure may include or correspond to secure data structure 332 of FIG. 3 or secure data structure 456 of FIG. 4.

Data components 502 may be generated during performance of a development process that includes multiple development stages, as described above with reference to FIGS. 1-4. In a particular implementation, the development process includes K stages, where K is any positive integer (at least three in the example of FIG. 5, though in other examples K is not so limited). In the example of FIG. 5, data components 502 include head data 504, stage 1 data 506, stage 2 data 508, stage K data 510, and completed development information 512. Each of data components 502 are generated at particular times during the development process. For example, head data 504 may be generated after initiation of the development process, stage 1 data 506 may be generated after completion of a first development stage ("Stage 1"), stage 2 data 508 may be generated after completion of a second development stage ("Stage 2"), stage K data 510 may be generated after completion of a Kth development stage ("Stage K"), and completed development information 512 may be generated after completion of all the K development stages of the development process. The information included in data components 502 is further described herein with reference to FIG. 7.

As data components 502 are generated, each data component undergoes hashing and signing 520 to generate a digital signature (e.g., a signed version of a hash of the corresponding data component). To illustrate, hashing and signing 520 may cause generation of signed hash head 522 (corresponding to head data 504), signed hash stage 1 524 (corresponding to stage 1 data 506), signed hash stage 2 526 (corresponding to stage 2 data 508), signed hash stage K 528 (corresponding to stage K data 510), and signed hash information 530 (corresponding to completed development information 512). Hashing and signing 520 may be performed with a private key associated with the development process, as described above with reference to FIGS. 3-4.

Signed hashes 522-530 may be stored as nodes in a tree structure, which may be distributed across multiple devices or implemented (or stored in) a blockchain, as described above with reference to FIGS. 3-4. In some implementations, the tree structure may be an MMR tree that uses last odd leaf duplication, or another type of tree structure or secure data structure. After signed hashes 522-530 are stored as entries (e.g., nodes) in the tree structure, entries (e.g., nodes) of one or more other layers may be generated and stored in the tree structure. In the example of FIG. 5, each node of a subsequent layer (in the orientation shown in FIG. 5) is based on two child nodes of a preceding layer. For example, node N1 may store a hash of a concatenation of signed hash head 522 and signed hash stage 1 524, node N2 may store a hash of a concatenation of signed hash stage 2 526 and a signed hash of other stage data, node N3 may store a hash of a concatenation of signed hash stage K 528 and signed hash information 530, and node N4 may be a duplicated node (if the number of nodes in this layer is odd). To further illustrate, node N5 may store a hash of a concatenation of node N1 and node N2, node N6 may store a hash of a concatenation of node N3 and node N4, and node N7 may store a hash of a concatenation of node N5 and node N6. Use of a MMR tree (or a binary tree with last odd leaf duplication) enables predictability in validating the development process (or portions thereof) based on a position of a digital signature in a leaf chain of the tree structure. Additionally, the tree structure has a smaller memory footprint than storing the data components themselves, for example, it is expected that many software development processes will result in tens to hundreds of hash values, instead of the entirety of tens to hundreds of data components.

The tree structure may be stored in a database accessible to node devices (or otherwise be provided to the node devices) to enable verification and validation of the software release and the data components at the node devices. In some implementations, the integrity of each data component (e.g., pipeline component or development stage) may be validated individually to validate the development process, or the development process (e.g., pipeline) as a whole may be validated without certifying component inclusion. To validate the integrity of a data component, a node device may calculate a hash of the data component (as received or as stored in the database), sign the hash using a public key associated with the development process, and validate that the signed hash generated by the node device is included in the tree structure. To validate the development process as a whole without certifying component inclusion, the node device may generate a hash of the completed development information 512, sign the hash using the public key, and validate that the signed hash generated by the node device is included in the tree structure. Additionally or alternatively, to validate the development process as a whole, hierarchical information in the tree structure may be similarly validated, such as node N7 as a non-limiting example.

Thus, FIG. 5 illustrates an example of a tree structure that may be used to store digital signatures generated based on data components generated during a development process of a software release. The tree structure may enable a node device that receives the software release to verify that the software release has completed an entirety (or a portion) of the development process in a secure manner, which may prevent the node device from executing potentially compromised software.

Figure 6:
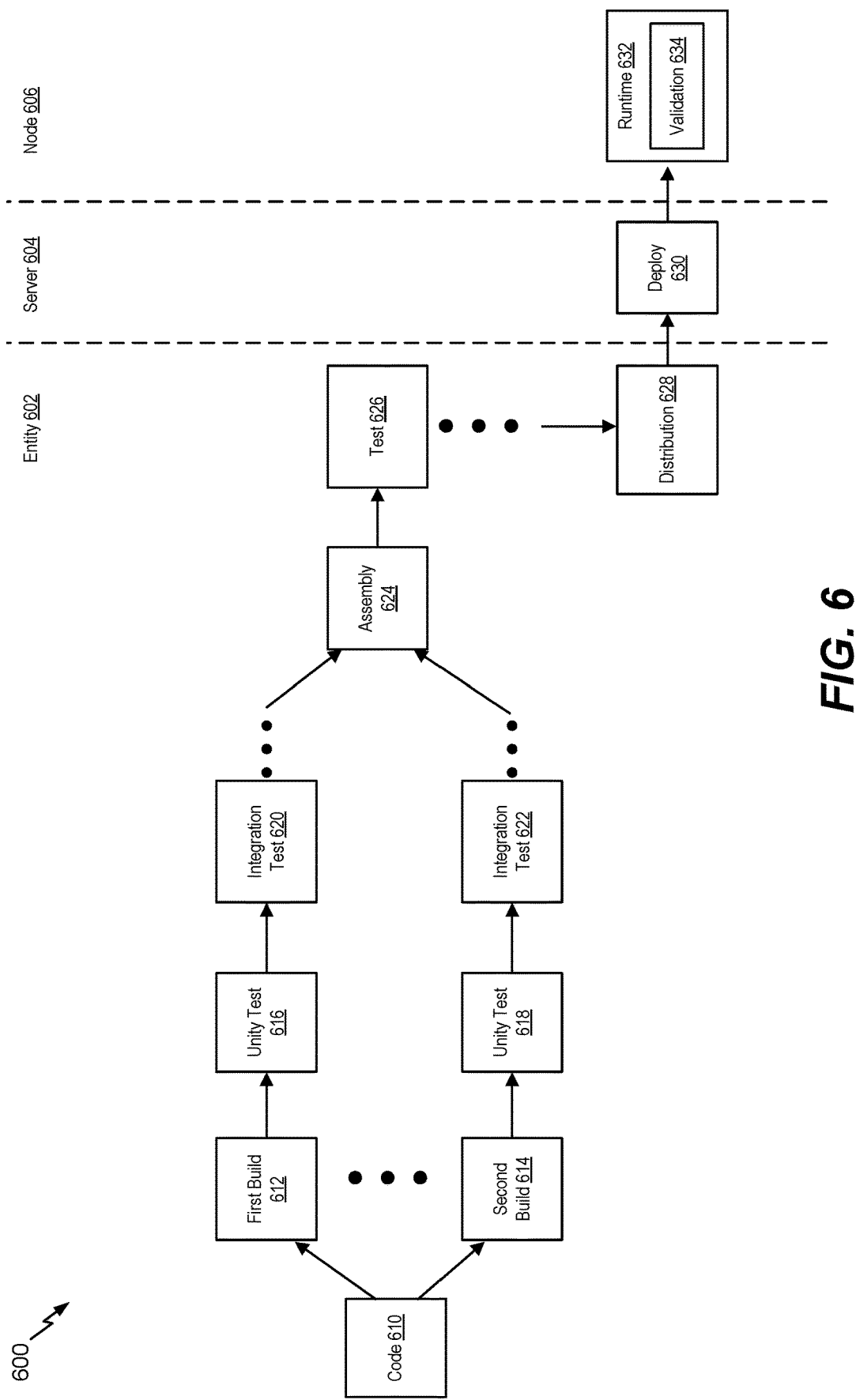
FIG. 6 is a block diagram of an example of multiple development stages of a software release.

Referring to FIG. 6, a block diagram of an example of multiple development stages of a software release according to one or more aspects are shown and designated 600. Multiple development stages 600 may include or correspond to development stages 340 of FIG. 3 or development stages 424 of FIG. 4.

In the example of FIG. 6, multiple development stages 600 include code generation 610, first build 612, second build 614, unity test 616, unity test 618, integration test 620, integration test 622, assembly 624, additional testing 626, distribution 628, deployment 630, and runtime 632. In other implementations, fewer development stages or more development stages may be included. In the example of FIG. 6, code generation 610, first build 612, second build 614, unity test 616, unity test 618, integration test 620, integration test 622, assembly 624, additional testing 626, and distribution 628 are performed at entity 602, deployment 630 is performed at server 604, and runtime 632 is performed at node 606. Entity 602 may include or correspond to entity server 140, entity 150, 150a, 150b, entity device 410, or any combination thereof. Server 604 may include or correspond to server 110, server 168, server 310, server 440, or any combination thereof. Node 606 may include or correspond to node device 160, 160a, 160b, 160c, 160d, node device 360, node device 470, or any combination thereof.

To start the development process, code may be generated at code generation 610. For example, code for one or more files (e.g., artifacts) may be generated or developed. The code may be combined into a first build job at first build 612. The first build job may undergo unity testing at unity test 616. During performance and/or upon successful completion of unity test 616, first stage data is generated. The first stage data may indicate one or more inputs of unity test 616, configuration data associated with unity test 616, one or more outputs of unity test 616, a start time of unity test 616, an end time of unity test 616, an author of unity test 616, one or more triggering conditions of unity test 616, other information, or any combination thereof. The first stage data may be provided to server 604 for storage and eventual transmission to node 606, similar to as described with reference to FIGS. 3-4. After completion of unity test 616, the first build job may undergo integration test 620. Second stage data may be generated during performance and/or upon completion of integration test 620, similar to the first stage data. After completion of integration test 620, the first build job may undergo additional tests or other development stages, which may generate corresponding stage data.

In addition to generating the first build job, the code may be combined into a second build job at second build 614. Although two builds are shown in FIG. 6, in other implementations, the code may undergo a single build or more than two builds. Also, although described as different build jobs, the first build job and the second build job may be different portions of the same build job. The second build job may undergo unity testing at unity test 618. During performance and/or upon successful completion of unity test 618, third stage data is generated. The third stage data may be provided to server 604 for storage and eventual transmission to node 606. After completion of unity test 618, second build job may undergo integration test 622. Fourth stage data may be generated during performance and/or upon completion of integration test 622, similar to the third stage data. After completion of integration test 622, the second build job may undergo additional tests or other development stages, which may generate corresponding stage data.

The first build job and the second build job (e.g., the first portion and the second portion) may be combined at assembly 624. Upon successful completion of assembly 624, stage data for assembly 624 may be generated. The stage data for assembly 624 may be provided to server 604 for storage and eventual transmission to node 606. After completion of assembly 624, the build may undergo additional testing 626. Additional stage data may be generated during performance and/or upon completion of additional testing 626, similar to as described for assembly 624. After completion of the additional testing 626, the build job may undergo one or more other testing stages or development stages prior to distribution 628.

At distribution 628, the software corresponding to the build job (e.g., the one or more files of the software release) is provided to server 604 for deployment. Server 604 may deploy the software release at 630, including transmitting the software release (and validation information, such as a secure data structure storing one or more digital signatures, the stage data, and a public key) to one or more node devices, including node 606. At runtime 632, the software release undergoes validation 634. For example, a validator (e.g., 363) may verify that the software release has successfully completed one or more of development stages 610-528 based on the digital signatures stored in the secure data structure, the stage data (e.g., of development stages 610-528), and a public key, as described with reference to FIGS. 3-4. For example, node 606 may generate and compare validation signatures to the digital signatures stored in the secure data structure to validate the digital signatures and the stage data before processing the software release.

Thus, FIG. 6 illustrates an example of generation of stage data during development stages of a software release. The stage data, in combination with other data components (e.g., head data, completed development information, etc.) can be used by a node device to enable the node device to verify completion of a development process that includes the development stages for a software release and to validate received digital signatures and received data components, such as stage data, prior to processing the software release, which may prevent the node device from being exposed to vulnerabilities of software that is not fully developed or tested or software that has been altered by a malicious actor after completion of the development process.

Figure 7:
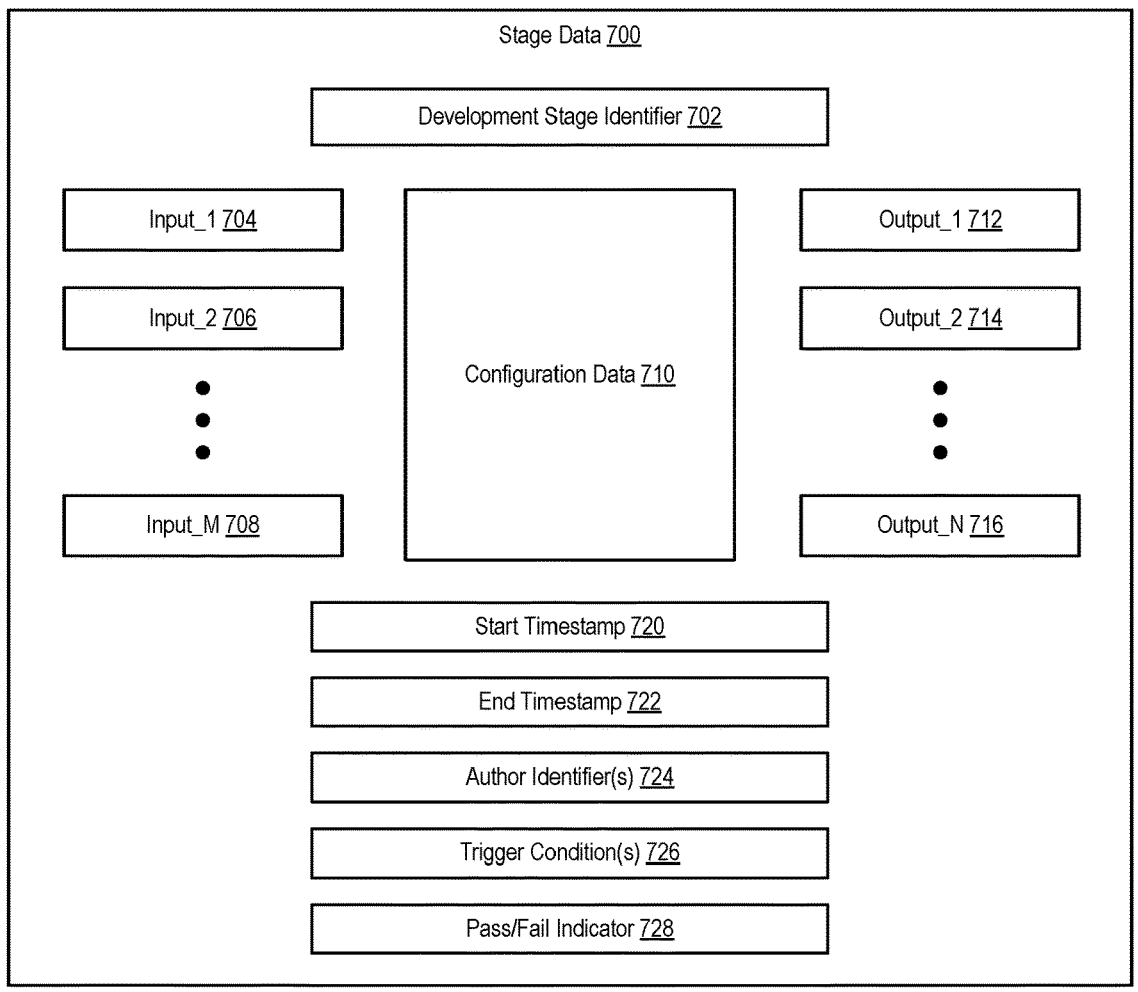
FIG. 7 illustrates an example of data components used to generate digital signatures for validating a software release.
Figure 7:
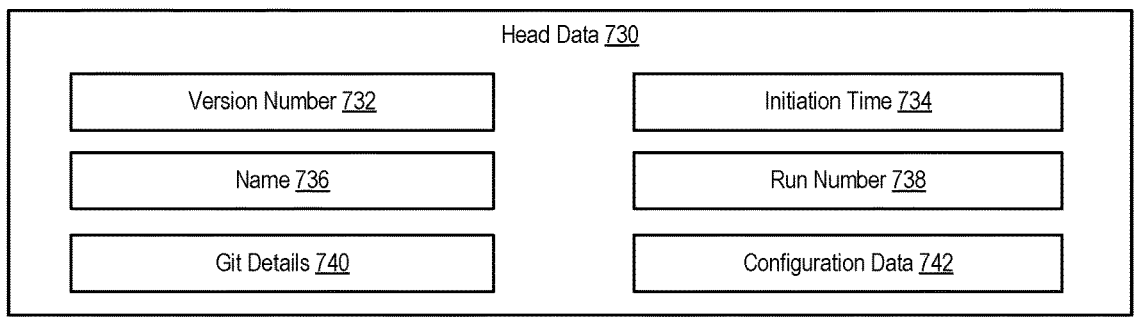
Figure 7:
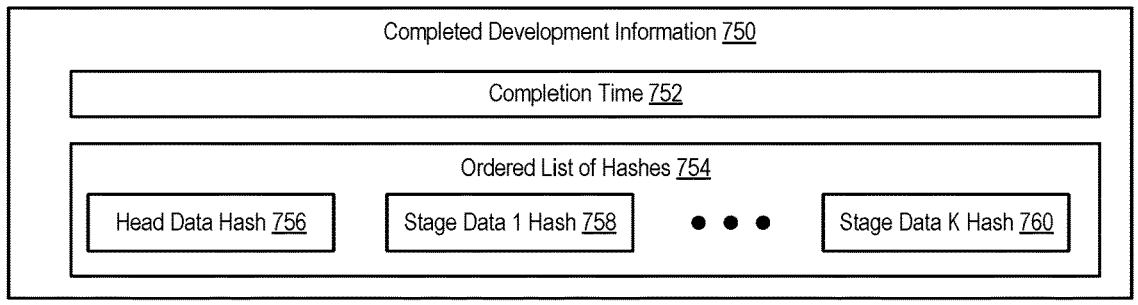

Referring to FIG. 7, an example of data components used to generate digital signatures for validating a software release according to one or more aspects is shown. The data components include stage data 700, head data 730, and completed development information 750. In some implementations, stage data 700 may include or correspond to stage data 319 of FIG. 3 or stage data 419 of FIG. 4, head data 730 may include or correspond to head data 318 of FIG. 3 or head data 418 of FIG. 4, and completed development information 750 may include or correspond to completed development information 323 of FIG. 3 or completed development information 422 of FIG. 4.

Stage data 700 includes a development stage identifier 702, one or more inputs including a first input 704 ("Input_1"), a second input 706 ("Input_2"), and an mth input 708 ("Input_M"), configuration data 710, one or more outputs including a first output 712 ("Output_1"), a second output 714 ("Output_2"), an nth output 716 ("Output N"), a start timestamp 720, an end timestamp 722, one or more author identifiers 724, one or more triggering conditions 726, and pass/fail indicator 728. Although FIG. 7 illustrates stage data 700 as including each of the elements 702-728, in some other implementations, one or more of 702-728 are optional or are not included in stage data 700.

Development stage identifier 702 may indicate a development stage of a development process for a software release, the development stage associated with stage data 700. For example, stage data 700 may be generated during performance and/or upon completion of the development stage indicated by development stage identifier 702. Inputs 704-708 indicate variables, constants, and/or other inputs to the development stage associated with stage data 700. Configuration data 710 includes or indicates one or more action flags associated with performance of the development stage associated with stage data 700, locations in a file system of actions or files to be acted on during performance of the development stage, registry names associated with performance of the development stage, document image names of documents to be accessed, created, or modified during performance of the development stage, and the like. Outputs 712-716 indicate variables, constants, and or other outputs from the development stage associated with stage data 700. Start timestamp 720 indicates a time when the development stage associated with stage data 700 is started. End timestamp 722 indicates a time when the development stage associated with stage data 700 is complete. Author identifiers 724 include identifier(s) of one or more authors (e.g., one or more users that initiated performance of the development stage associated with stage data 700). Trigger conditions 726 indicate one or more conditions that triggered performance of the development stage associated with stage data 700. Pass/fail indicator 728 (e.g., a result flag, a particular bit, etc.) has a first value if the software release passed the development stage and a second value if the software release failed the development stage.

Head data 730 includes general information and/or parameters associated with the development process (e.g., a pipeline) of the software release, such as a version number 732, an initiation time 734, a name 736, a run number 738, git details 740, and configuration data 742. Although FIG. 7 illustrates head data 730 as including each of the elements 732-742, in some other implementations, one or more of 732-742 are optional or are not included in head data 730. Version number 732 may indicate a version of the development process (e.g., a pipeline version). Initiation time 734 may be a timestamp that is recorded at a time of initiation of the development process. Name 736 may indicate a name (e.g., a pipe name) or other identifier that identifies the development process. Run number 738 may indicate a particular run of the development process (e.g., a number of the performance of the development process). Git details 740 may indicate details of a git command associated with the development process (e.g., pipe git details). Configuration data 742 may indicate a full config at initiation of the development process, such as a full pipeline yaml configuration. In some implementations, configuration data 742 may be converted from to a string format.

Completed development information 750 includes a completion time 752 and an ordered list of hashes 754 corresponding to the run components (e.g., head data 730 and multiple instances of stage data 700) generated during performance of the development process. Although FIG. 7 illustrates completed development information 750 as including each of the elements 752-754, in some other implementations, one or more of 752-754 are optional or are not included in completed development information 750. Completion time 752 may be a timestamp that is recorded at a time of completion of the development process (e.g., completion of the last development stage). Ordered list of hashes 754 may include multiple hashes of other data components, in a particular order (e.g., an order of generation or a predefined order, as non-limiting examples). In the example of FIG. 7, ordered list of hashes 754 includes head data hash 756, stage data 1 hash 758, and stage data K hash 760, where head data hash 756 is a first entry in the list, stage data 1 hash 758 is a second entry in the list, and stage data K hash 760 is a last entry in the list. Head data hash 756 is a hash (e.g., a SHA-256 hash, as a non-limiting example) of head data 730, stage data 1 hash 758 is a hash of stage data from a first development stage, and stage data K hash 760 is a hash of stage data from a Kth development stage (e.g., a last development stage of the development process).

Thus, FIG. 7 illustrates an example of data components, such as stage data 700, head data 730, and completed development information 750. The data components may be used to generate digital signatures or validation signatures, to enable node devices to validate received data components associated with software verify that the received software has completed a development process.

Figure 8:
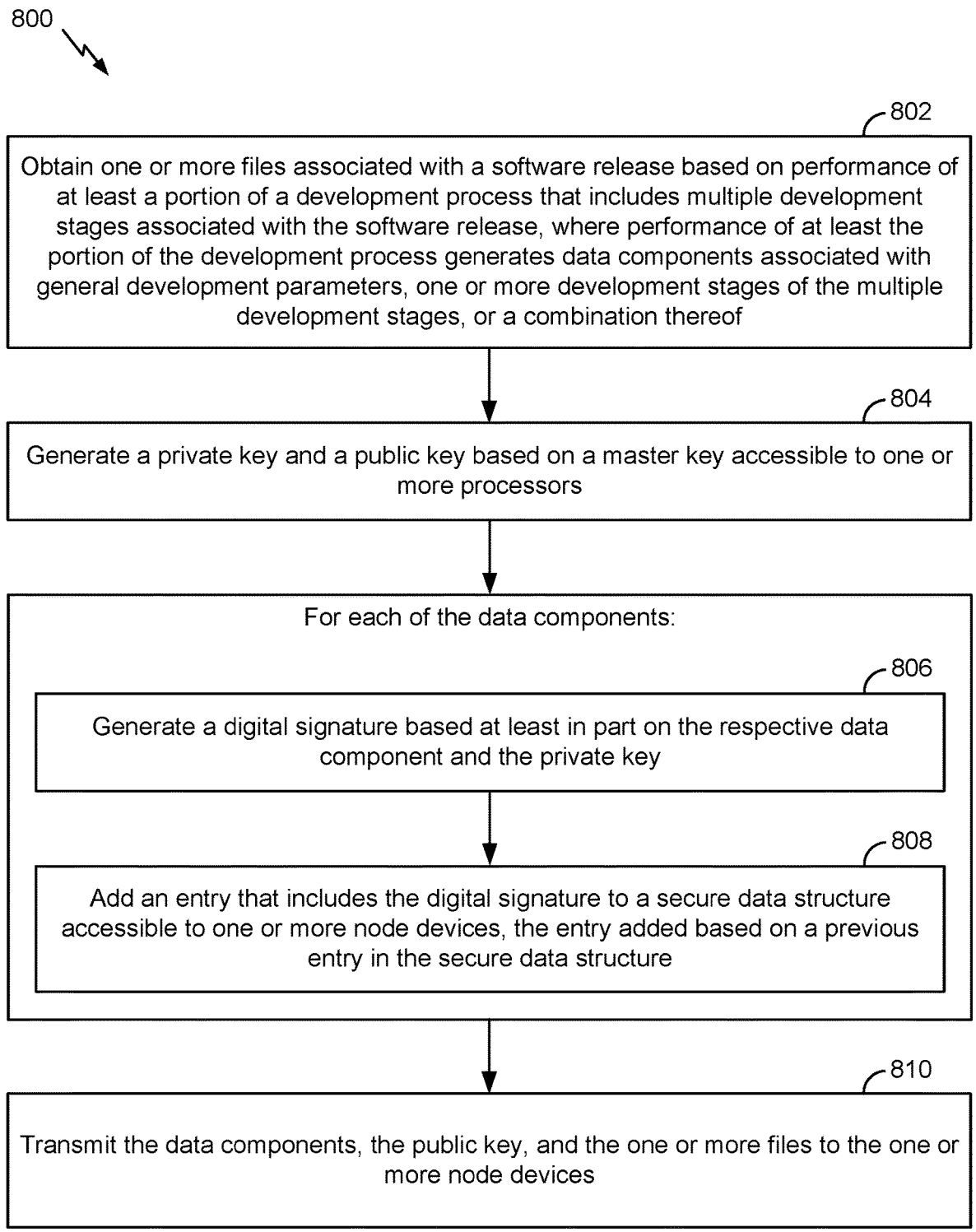
FIG. 8 is a flow diagram of an example of a method for sharing validation information of a software release associated with multiple development stages.
Figure 9:
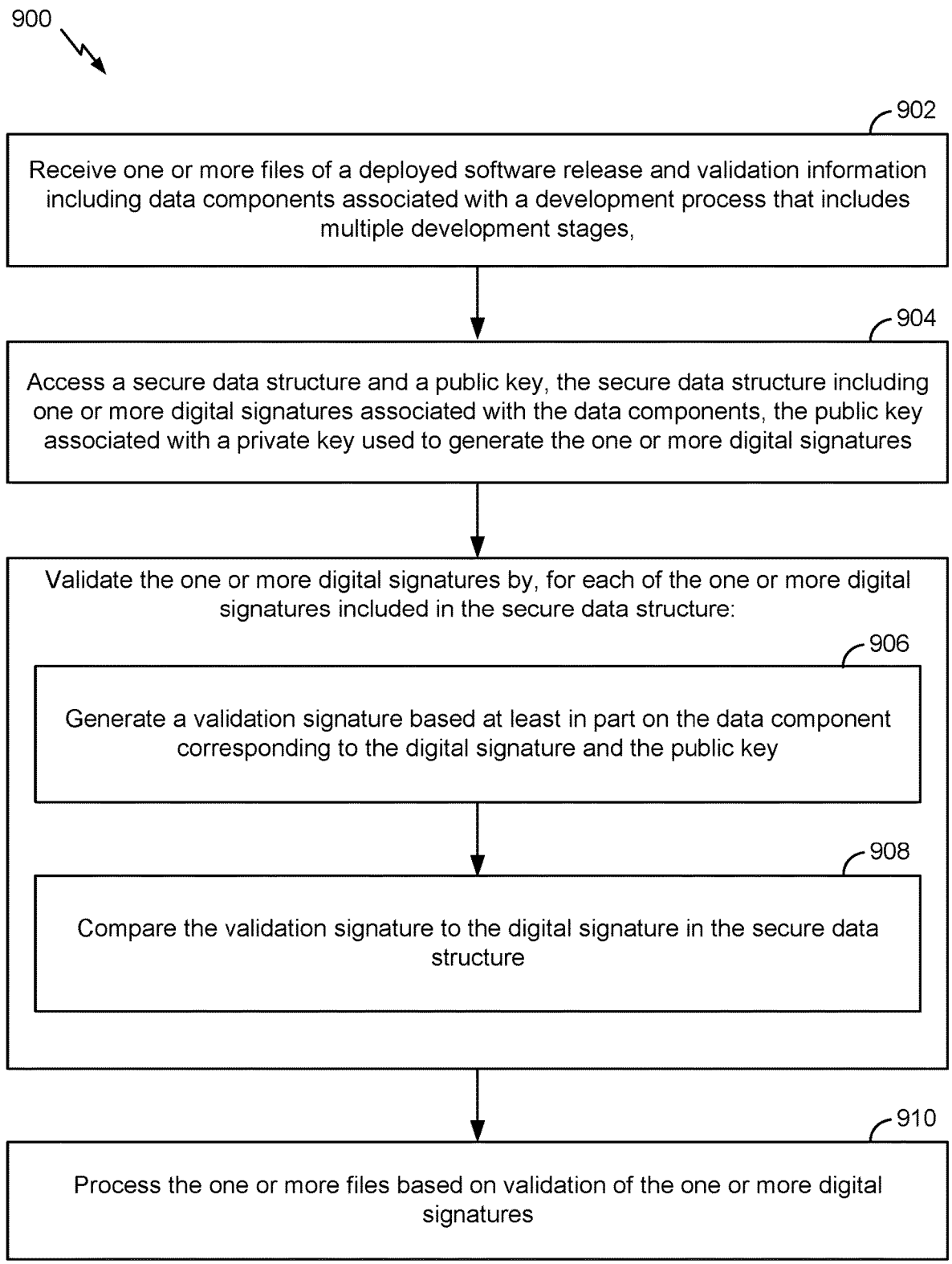
FIG. 9 is a flow diagram of an example of a method for validation of a deployed software release associated with multiple development stages.

FIGS. 8-9 are flow diagrams of methods of sharing validation information and validating a deployed software release according to one or more aspects. Each of the methods of FIGS. 8-9 may be stored in a computer-readable storage medium as instructions that, when executed by one or more processors, cause the one or more processors to perform the operations of the method of FIG. 8 or FIG. 9.

Referring to FIG. 8, a flow diagram of a method for sharing validation information of a software release associated with multiple development stages according to one or more aspects is shown as a method 800. In some implementations, method 800 may be performed by server 110, 168 (e.g., one or more processors 250, manager 252, and/or deployer 253), server 310 (e.g., one or more processors 312), and/or server 440 (e.g., one or more processors 442).

At 802, method 800 includes obtaining one or more files associated with the software release based on performance of at least a portion of a development process that includes the multiple development stages. Performance of at least the portion of the development process may generate data components associated with general development parameters, one or more development stages of the multiple development stages, or a combination thereof. For example, server 310 may generate software 316 based on performance of at least a portion of a development process that includes development stages 340. Performance of at least the portion of the development process may generate data components 317. As another example, server 440 may receive software 416 and data components 417 from entity device 410.

At 804, method 800 includes generating a private key and a public key based on a master key accessible to one or more processors. For example, server 310 may generate public key 326 and private key 328 (e.g., a public key/private key pair) based on master key 324.

At 806, method 800 includes, for each of the data components, generating a digital signature based at least in part on the respective data component and the private key. For example, server 310 may generate digital signatures 330 based on data components 317 and private key 328.

At 808, method 800 includes, for each of the data components, adding an entry that includes the digital signature to a secure data structure accessible to one or more node devices. The entry is added based on a previous entry in the secure data structure. For example, server 310 may add a second entry including second digital signature 336 to secure data structure 332 based on a first entry that includes first digital signature 334. In some implementations, the secure data structure is immutable to other devices (e.g., node devices or other endpoint devices). In some implementations, the secure data structure includes or corresponds to a private blockchain or a tree structure, or is configured to store a tree structure, as non-limiting examples.

At 810, method 800 includes initiating transmission of the data components, the public key, and the one or more files to one or more node devices. For example, server 310 may transmit software release 350 to node device 360. Software release 350 includes software 316 (e.g., one or more files) and validation information 352 that includes data components 317, and optionally public key 326 and secure data structure 332. Alternatively, secure data structure 332 may be accessible to node device 360, such as by being stored in a database.

In some implementations, generating a digital signature for a first data component of the data components may include generating the digital signature based on an entirety of the first data component and the private key. For example, server 310 may generate first digital signature 334 based on an entirety (or a portion thereof) of head data 318 and private key 328. Alternatively, generating a digital signature for a first data component of the data components may include generating a hash value based on the first data component and generating the digital signature based on the hash value and the private key. For example, server 310 may generate a first hash value based on head data 318 and may generate first digital signature 334 based on the first hash value and private key 328.

In some implementations, method 800 also includes discarding the private key based on addition of a final entry to the secure data structure. The final entry corresponds to a final data component associated with the development process. For example, server 310 may discard private key 328 based on addition of a final (e.g., last) entry to secure data structure 332. Additionally or alternatively, method 800 may further include, prior to access of the secure data structure to the one or more node devices, encrypting the secure data structure based on a storage key accessible to the one or more processors and the one or more node devices. For example, server 310 may encrypt secure data structure 332 based on storage key 338. In some such implementations, the storage key includes the master key. For example, storage key 338 may include or correspond to master key 324, or may be based on master key 324.

In some implementations, generating the digital signature and adding the entry for each of the data components includes generating a first digital signature based at least in part on first stage data associated with a first development stage of the multiple development stages and the private key, adding a first entry that includes the first digital signature to the secure data structure, generating a second digital signature based at least in part on second stage data associated with a second development stage of the multiple development stages that is subsequent to the first development stage and the private key, and adding a second entry that includes the second digital signature and is based at least in part on the first entry to the secure data structure. For example, server 310 may add a first entry to secure data structure 332 that includes first digital signature 334, and server 310 may add a second entry to secure data structure 332 that includes second digital signature 336 and is based at least in part on the first entry in secure data structure 332 (e.g., includes a hash value based on the first entry).

In some implementations, obtaining the one or more files may include performing at least the portion of the development process to generate the one or more files. For example, server 310 (e.g., processor 312) may initiate the development process and/or perform development stages 340 to generate software 316 (e.g., one or more files) and data components 317. Alternatively, obtaining the one or more files may include receiving the one or more files from one or more entity devices that perform at least the portion of the development process. For example, server 440 may receive software 416 (e.g., one or more files) and data components 417 from entity device 410 that performs the development process that includes development stages 424.

Thus, method 800 describes a method for sharing validation information for a software release between a server and a node device. Providing the validation information to the node device enables the node device to validate whether software has successfully completed multiple development stages of a development process without alteration, which may prevent the node device from processing software that is not fully developed or tested, or that has been altered by a malicious actor.

Referring FIG. 9, a flow diagram of a method for validation of a deployed software release associated with multiple development stages according to one or more aspects of the disclosure is shown as a method 900. In some implementations, method 900 may be performed by node device 160, 160a, 160b, 160c, 160d, node device 360, and/or node device 470.

At 902, method 900 includes receiving one or more files of the deployed software release and validation information including data components associated with a development process that includes the multiple development stages. For example, node device 360 may receive validation information 352 (e.g., data components 317) from server 310.

At 904, method 900 includes accessing a secure data structure and a public key associated with the development process. The secure data structure includes one or more digital signatures associated with the data components. The public key is associated with a private key used to generate the one or more digital signatures. For example, node device 360 may access secure data structure 332 and public key 326. Secure data structure 332 may store one or more of digital signatures 330, and public key 326 may be associated with private key 328 used by server 310 to generate digital signatures 330. In some implementations, the one or more files, the stage data, and the public key are received from an artifact repository server or an entity device. For example, node device 360 of FIG. 3 may receive validation information 352 from server 310 (e.g., an artifact repository server), and node device 470 of FIG. 4 may receive validation information 462 from server 440 (e.g., an artifact repository server) or from entity device 410.

At 906, method 900 includes validating the one or more digital signatures by, for each of the one or more digital signatures included in the secure data structure, generating a validation signature based at least in part on the data component corresponding to the digital signature and the public key. For example, node device 360 may generate validation signatures 366 based on data components 317 and public key 326.

At 908, method 900 includes validating the one or more digital signatures by, for each of the one or more digital signatures included in the secure data structure, comparing the validation signature to the digital signature in the secure data structure. For example, node device 360 may compare validation signatures 366 to corresponding ones of digital signatures 330 stored in secure data structure 332 to validate the digital signatures.

At 910, method 900 includes processing the one or more files based on validation of the one or more digital signatures. For example, node device 360 may process software 316 based on successful validation of the digital signatures stored in secure data structure 332 (which verifies that software 316 successfully completed the development process including development stages 340).

In some implementations, validating a first digital signature of the one or more digital signatures included in the secure data structure may include generating a first validation signature based at least in part on a first data component corresponding to the first digital signature and the public key, comparing the first validation signature to the first digital signature, and validating the first digital signature based on the first validation signature matching the first digital signature. For example, node device 360 may generate first validation signature 367 based at least in part on head data 318 and public key 326. Node device 360 may compare first validation signature 367 to first digital signature 334 and may validate first digital signature 334 based on first validation signature 367 matching first digital signature 334. Additionally or alternatively, method 900 may further include decrypting the secure data structure based on a storage key accessible to the one or more processors. For example, node device 360 may decrypt secure data structure 332 (or any encrypted portion of validation information 352) based on storage key 338.

In some implementations, generating a validation signature for a first data component of the data components may include generating the validation signature based on an entirety of the first data component and the public key. For example, node device 360 may generate first validation signature 367 based on an entirety (or a portion thereof) of head data 318 and public key 326. Alternatively, generating a validation signature for a first data component of the data components may include generating a hash value based on the first data component and generating the validation signature based on the hash value and the public key. For example, node device 360 may generate a first hash value based on head data 318, and node device 360 may generate first validation signature 367 based on the first hash value and public key 326.

In some implementations, processing the one or more files may include loading the one or more files to a memory responsive to validating the one or more digital signatures and setting a flag corresponding to the one or more files to indicate that the one or more files have completed the multiple development stages. For example, node device 360 may load software 316 to memory 364 and set validation flag 369 based on validation of the digital signatures stored in secure data structure 332. In some such implementations, processing the one or more files may further include executing the one or more files and initiating transmission of a notification indicating that the one or more files are accepted. For example, node device 360 may execute software 316 and transmit a notification to server 310, the notification indicating that software 316 is accepted. Additionally, or alternatively, processing the one or more files may include discarding the one or more files responsive to responsive to a failure to validate the one or more digital signatures. For example, node device 360 may discard software 316 from transaction directory 370 based on failure of validation of the digital signatures stored in secure data structure 332. In some such implementations, processing the one or more files may further include initiating transmission of a notification indicating that the one or more files are rejected. For example, node device 360 may transmit a notification to server 310, the notification indicating that software 316 is rejected, and optionally information associated with any non-validated digital signatures, such as development stages associated with the digital signatures, authors associated with the digital signatures, other information, or a combination thereof.

Thus, method 900 describes a method for using validation information, such as data components, a public key, and a secure data structure that stores digital signatures, at a node device to validate whether software has successfully completed multiple development stages of a development process without alteration. Validation of software may prevent the node device from processing software that is not fully developed or tested, thereby preventing the node device from being exposed to vulnerabilities corresponding to the not fully developed or otherwise altered software.

In some implementations, methods 800 and/or 900 can be combined such that one or more operations described with reference to one of the methods of FIGS. 8-9 may be combined with one or more operations of another of FIGS. 8-9. For example, one or more operations of method 800 may be combined with one or more operations of method 900. As another example, one or more operations of method 900 may be combined with one or more operations of method 800.

In some aspects, techniques for supporting sharing of validation information of a software release may include additional aspects, such as any single aspect or any combination of aspects described below or in connection with one or more other processes or devices described elsewhere herein. In some aspects, supporting sharing of validation information of a software release may include a system configured to obtain one or more files associated with the software release based on performance of at least a portion of a development process that includes the multiple development stages. Performance of at least the portion of the development process generates data components associated with general development parameters, one or more development stages of the multiple development stages, or a combination thereof. The system is also configured to generate a private key and a public key based on a master key accessible to the system. The system is configured to, for each of the data components, generate a digital signature based at least in part on the respective data component and the private key and add an entry that includes the digital signature to a secure data structure accessible to one or more node devices. The entry is added based on a previous entry in the secure data structure. The system is further configured to initiate transmission of the data components, the public key, and the one or more files to the one or more node devices. In some implementations, the system includes one or more devices, one or more processors, one or more package modules, or a combination thereof. For example, one or more operations described with reference to the system may be performed by the one or more devices, the one or more processors, the one or more package modules, or the combination thereof. In some implementations, the system may include at least one processor, and a memory coupled to the at least one processor. The at least one processor may be configured to perform operations described herein with respect to the system. In some other implementations, the system may include a non-transitory computer-readable medium having program code recorded thereon and the program code may be executable by a computer for causing the computer to perform operations described herein with reference to the system. In some implementations, the system may include one or more means configured to perform operations described herein. In some implementations, a method of a repository supporting multiple package types may include one or more operations described herein with reference to the system.

In a first aspect, the secure data structure is immutable to other devices.

In a second aspect, alone or in combination with the first aspect, the secure data structure includes a private blockchain.

In a third aspect, alone or in combination with one or more of the first through second aspects, the secure data structure includes a tree structure.

In a fourth aspect, alone or in combination with one or more of the first through third aspects, generating a digital signature for a first data component of the data components includes generating the digital signature based on an entirety of the first data component and the private key.

In a fifth aspect, alone or in combination with one or more of the first through third aspects, generating a digital signature for a first data component of the data components includes generating a hash value based on the first data component and generating the digital signature based on the hash value and the private key.

In a sixth aspect, alone or in combination with one or more of the first through fifth aspects, the system discards the private key based on addition of a final entry to the secure data structure. The final entry corresponds to a final data component associated with the development process.

In a seventh aspect, alone or in combination with one or more of the first through sixth aspects, the system, prior to access of the secure data structure to the one or more node devices, encrypts the secure data structure based on a storage key accessible to the system and the one or more node devices.

In an eighth aspect, alone or in combination with one or more of the first through seventh aspects, generating the digital signature and adding the entry for each of the data components includes generating a first digital signature based at least in part on first stage data associated with a first development stage of the multiple development stages and the private key.

In a ninth aspect, alone or in combination with the eighth aspect, generating the digital signature and adding the entry for each of the data components includes adding a first entry that includes the first digital signature to the secure data structure.

In a tenth aspect, alone or in combination with one or more of the eighth through ninth aspects, generating the digital signature and adding the entry for each of the data components includes generating a second digital signature based at least in part on second stage data associated with a second development stage of the multiple development stages and the private key. The second development stage is subsequent to the first development stage.

In an eleventh aspect, alone or in combination with one or more of the eighth through tenth aspects, generating the digital signature and adding the entry for each of the data components includes adding a second entry that includes the second digital signature and is based at least in part on the first entry to the secure data structure.

In a twelfth aspect, alone or in combination with one or more of the first through eleventh aspects, obtaining the one or more files includes performing at least the portion of the development process by the system to generate the one or more files.

In a thirteenth aspect, alone or in combination with one or more of the first through eleventh aspects, obtaining the one or more files includes receiving the one or more files from one or more entity devices that perform at least the portion of the development process.

In a fourteenth aspect, alone or in combination with one or more of the first through thirteenth aspects, the data components include head data, one or more stage data associated with the one or more development stages, completed development information, or any combination thereof.

In a fifteenth aspect, in combination with the fourteenth aspect, the head data includes a version number associated with the development process, a start time for the development process, an identifier associated with the development process, a run number associated with the development process, a string of configuration details associated with the development process, or any combination thereof.

In a sixteenth aspect, alone or in combination with one or more of the fourteenth through fifteenth aspects, stage data associated with a particular development stage of the multiple development stages includes configuration data associated with the particular development stage, one or more inputs to the particular development stage, one or more outputs from the particular development stage, a start time for the particular development stage, an end time for the particular development stage, one or more authors associated with the particular development stage, a result associated with the particular development stage, or any combination thereof.

In a seventeenth aspect, alone or in combination with one or more of the fourteenth through sixteenth aspects, the completed development information includes a completion time for the development process, an ordered list of hashes of each other data component of the data components, or both.

In an eighteenth aspect, alone or in combination with one or more of the first through seventeenth aspects, the secure data structure is configured for serial addition of entries. Each subsequent entry of the secure data structure is based at least in part on a previous entry of the secure data structure.

In a nineteenth aspect, alone or in combination with one or more of the first through eighteenth aspects, the multiple development stages correspond to a continuous integration/continuous delivery (CI/CD) pipeline for building and deploying the software release.

In some aspects, techniques for supporting validation of a deployed software release may include additional aspects, such as any single aspect or any combination of aspects described below or in connection with one or more other processes or devices described elsewhere herein. In some aspects, supporting validation of a deployed software release may include a system configured to receive one or more files of the deployed software release and validation information including data components associated with a development process that includes the multiple development stages. The system is also configured to access a secure data structure and a public key associated with the development process. The secure data structure includes one or more digital signatures associated with the data components. The public key is associated with a private key used to generate the one or more digital signatures. The system is also configured to validate the one or more digital signatures by, for each of the one or more digital signatures included in the secure data structure, generating a validation signature based at least in part on the data component corresponding to the digital signature and the public key, and comparing the validation signature to the digital signature in the secure data structure. The system is further configured to process the one or more files based on validation of the one or more digital signatures. In some implementations, the system includes one or more devices, one or more processors, one or more package modules, or a combination thereof. For example, one or more operations described with reference to the system may be performed by the one or more devices, the one or more processors, the one or more package modules, or the combination thereof. In some implementations, the system may include at least one processor, and a memory coupled to the at least one processor. The at least one processor may be configured to perform operations described herein with respect to the system. In some other implementations, the system may include a non-transitory computer-readable medium having program code recorded thereon and the program code may be executable by a computer for causing the computer to perform operations described herein with reference to the system. In some implementations, the system may include one or more means configured to perform operations described herein. In some implementations, a method of a repository supporting multiple package types may include one or more operations described herein with reference to the system.

In a twentieth aspect, validating a first digital signature of the one or more digital signatures included in the secure data structure includes generating a first validation signature based at least in part on a first data component corresponding to the first digital signature and the public key, comparing the first validation signature to the first digital signature, and validating the first digital signature based on the first validation signature matching the first digital signature.

In a twenty-first aspect, alone or in combination with the twentieth aspect, generating a validation signature for a first data component of the data components includes generating the validation signature based on an entirety of the first data component and the public key.

In a twenty-second aspect, alone or in combination with the twentieth aspect, generating a validation signature for a first data component of the data components includes generating a hash value based on the first data component and generating the validation signature based on the hash value and the public key.

In a twenty-third aspect, alone or in combination with one or more of the twentieth through twenty-second aspects, processing the one or more files includes loading the one or more files to a memory responsive to validating the one or more digital signatures.

In a twenty-fourth aspect, alone or in combination with the twenty-third aspect, processing the one or more files includes setting a flag corresponding to the one or more files to indicate that the one or more files have completed the multiple development stages.

In a twenty-fifth aspect, in combination with one or more of the twenty-third through twenty-fourth aspects, processing the one or more files further includes executing the one or more files.

In a twenty-sixth aspect, in combination with one or more of the twenty-third through twenty-fifth aspects, processing the one or more files further includes initiating transmission of a notification indicating that the one or more files are accepted.

In a twenty-seventh aspect, alone or in combination with one or more of the twentieth through twenty-sixth aspects, processing the one or more files includes discarding the one or more files responsive to responsive to a failure to validate the one or more digital signatures.

In a twenty-eighth aspect, in combination with the twenty-seventh aspect, processing the one or more files further includes initiating transmission of a notification indicating that the one or more files are rejected.

In a twenty-ninth aspect, alone or in combination with one or more of the twentieth through the twenty-eighth aspects, the data components include head data associated with general development parameters, stage data associated with the multiple development stages, and completed development information comprising an ordered list of hashes of the head data and the stage data.

In a thirtieth aspect, alone or in combination with one or more of the twentieth through twenty-ninth aspects, the one or more files and the validation information are received from an artifact repository server or an entity device.

In a thirty-first aspect, alone or in combination with one or more of the twentieth through thirtieth aspects, the multiple development stages correspond to a continuous integration/continuous delivery (CI/CD) pipeline for building and deploying the software release.

Although one or more of the disclosed figures may illustrate systems, apparatuses, methods, or a combination thereof, according to the teachings of the disclosure, the disclosure is not limited to these illustrated systems, apparatuses, methods, or a combination thereof. One or more functions or components of any of the disclosed figures as illustrated or described herein may be combined with one or more other portions of another function or component of the disclosed figures. Accordingly, no single implementation described herein should be construed as limiting and implementations of the disclosure may be suitably combined without departing from the teachings of the disclosure.

The steps of a method or algorithm described in connection with the implementations disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Although the present disclosure and its advantages have been described in detail, it should be understood that various changes, substitutions and alterations can be made herein without departing from the scope of the present disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for sharing validation information of a software release associated with multiple development stages, the method comprising:
   obtaining, by one or more processors, one or more files associated with the software release based on performance of at least a portion of a development process that includes the multiple development stages, where performance of at least the portion of the development process generates data components associated with general development parameters, one or more development stages of the multiple development stages, or a combination thereof;
   generating, by the one or more processors and based on a master key accessible to the one or more processors and that operates as a private cryptographic key for a universal artifact repository, a private key and a public key;
   for each of the data components:
      generating, by the one or more processors, a digital signature based at least in part on the respective data component and the private key; and
      adding, by the one or more processors, an entry that includes the digital signature to a secure data structure accessible to one or more node devices, the entry added based on a previous entry in the secure data structure; and
   initiating, by the one or more processors, transmission of the data components, the public key, and the one or more files to the one or more node devices.

2. The method of claim 1, where the secure data structure is immutable to other devices.

3. The method of claim 1, where the secure data structure comprises a private blockchain.

4. The method of claim 1, where the secure data structure comprises a tree structure.

5. The method of claim 1, where generating a digital signature for a first data component of the data components comprises:
   generating the digital signature based on an entirety of the first data component and the private key.

6. The method of claim 1, where generating a digital signature for a first data component of the data components comprises:
   generating a hash value based on the first data component; and
   generating the digital signature based on the hash value and the private key.

7. The method of claim 1, further comprising:
   discarding, by the one or more processors, the private key based on addition of a final entry to the secure data structure, the final entry corresponding to a final data component associated with the development process.

8. The method of claim 1, further comprising:
   prior to access of the secure data structure to the one or more node devices, encrypting, by the one or more processors, the secure data structure based on a storage key accessible to the one or more processors and the one or more node devices, the storage key distinct from the private key and the public key.

9. The method of claim 1, where generating the digital signature and adding the entry for each of the data components comprises:
   generating a first digital signature based at least in part on first stage data associated with a first development stage of the multiple development stages and the private key;

adding a first entry that includes the first digital signature to the secure data structure;

generating a second digital signature based at least in part on second stage data associated with a second development stage of the multiple development stages and the private key, the second development stage subsequent to the first development stage; and adding a second entry that includes the second digital signature and is based at least in part on the first entry to the secure data structure.

10. The method of claim 1, where obtaining the one or more files comprises performing at least the portion of the development process by the one or more processors to generate the one or more files.

11. The method of claim 1, where obtaining the one or more files comprises receiving the one or more files from one or more entity devices that perform at least the portion of the development process.

12. A system for sharing validation information of a software release associated with multiple development stages, the system comprising:

at least one memory storing instructions; and one or more processors coupled to the at least one memory, the one or more processors configured to execute the instructions to cause the one or more processors to:

obtain one or more files associated with the software release based on performance of at least a portion of a development process that includes the multiple development stages, where performance of at least the portion of the development process generates data components associated with general development parameters, one or more development stages of the multiple development stages, or a combination thereof;

generate, based on a master key accessible to the one or more processors and that operates as a private cryptographic key for a universal artifact repository, a private key and a public key;

for each of the data components:
generate a digital signature based at least in part on the respective data component and the private key; and
add an entry that includes the digital signature to a secure data structure accessible to one or more node devices, the entry added based on a previous entry in the secure data structure; and initiate transmission of the data components, the public key, and the one or more files to the one or more node devices.

13. The system of claim 12, where the data components comprise head data, one or more stage data associated with the one or more development stages, completed development information, or any combination thereof.

14. The system of claim 13, where the head data comprises a version number associated with the development process, a start time for the development process, an identifier associated with the development process, a run number associated with the development process, a string of configuration details associated with the development process, or any combination thereof.

15. The system of claim 13, where stage data associated with a particular development stage of the multiple development stages comprises configuration data associated with the particular development stage, one or more inputs to the particular development stage, one or more outputs from the particular development stage, a start time for the particular development stage, an end time for the particular development stage, one or more authors associated with the particular development stage, a result associated with the particular development stage, or any combination thereof.

16. The system of claim 13, where the completed development information comprises a completion time for the development process, an ordered list of hashes of each other data component of the data components, or both.

17. The system of claim 12, where the secure data structure is configured for serial addition of entries, and where each subsequent entry of the secure data structure is based at least in part on a previous entry of the secure data structure.

18. The system of claim 12, where the multiple development stages correspond to a continuous integration/continuous delivery (CI/CD) pipeline for building and deploying the software release.

19. The system of claim 13, where the data components comprise the head data, and where the head data comprises the general development parameters that are available at initiation of the development process.

20. The system of claim 13, where the data components comprise the head data, and where the head data comprises full configuration data that is available at initiation of the development process.

21. The system of claim 13, where the data components comprise the one or more stage data, and where first stage data comprises configuration data associated with a first development stage of the one or more development stages.

22. The system of claim 13, where the data components comprise the one or more stage data, and where first stage data comprises one or more inputs to a first development stage of the one or more development stages and one or more outputs from the first development stage.

23. The system of claim 13, where the data components comprise the completed development information, and where the completed development information comprises an ordered list of hashes of the head data and the one or more stage data.

* * * * *